US008925756B2

(12) United States Patent
Tarapata et al.

(10) Patent No.: US 8,925,756 B2
(45) Date of Patent: Jan. 6, 2015

(54) METHOD AND APPARATUS FOR GAS CYLINDER SEALING

(75) Inventors: Chris Tarapata, North Andover, MA (US); Terrence K. Jones, Sharon, MA (US); Gregory Lambrecht, Natick, MA (US)

(73) Assignee: Coravin, Inc., Burlington, MA (US)

( * ) Notice: Subject to any disclaimer, the term of this patent is extended or adjusted under 35 U.S.C. 154(b) by 0 days.

(21) Appl. No.: 13/569,658

(22) Filed: Aug. 8, 2012

(65) Prior Publication Data

US 2014/0042703 A1    Feb. 13, 2014

(51) Int. Cl.
*B65D 45/32* (2006.01)
*B65D 51/16* (2006.01)
*B65D 41/50* (2006.01)
*B65D 39/04* (2006.01)
*B65D 43/04* (2006.01)
*B65D 43/08* (2006.01)
*B65D 47/36* (2006.01)
*F17C 13/06* (2006.01)
*F16J 15/02* (2006.01)

(52) U.S. Cl.
CPC ............... *F16J 15/02* (2013.01); *F17C 13/06* (2013.01); *F17C 2201/058* (2013.01); *F17C 2205/0305* (2013.01); *F17C 2205/032* (2013.01); *F17C 2221/011* (2013.01); *F17C 2221/013* (2013.01); *F17C 2221/014* (2013.01); *F17C 2221/016* (2013.01); *F17C 2221/03* (2013.01); *F17C 2221/031* (2013.01); *F17C 2223/0123* (2013.01); *F17C 2260/036* (2013.01); *F17C 2270/05* (2013.01); *F17C 2270/0736* (2013.01); *F17C 2205/0308* (2013.01)

USPC ...... 220/582; 220/319; 220/581; 220/203.19; 220/265; 220/89.1; 215/250; 215/247; 215/249; 222/5; 222/3

(58) Field of Classification Search
USPC .................. 215/343, 250, 247, 249, 344, 345; 220/583, 277, 89.2, 213, 378, 582, 220/581, 203.19, 265, 89.1, 319, 320, 324; 222/5, 3, 399; 141/19, 329; 277/649, 277/648, 650, 647, 644
See application file for complete search history.

(56) References Cited

U.S. PATENT DOCUMENTS

| 718,163 A | 1/1903 | Sherrard |
|---|---|---|
| 1,509,916 A | 9/1924 | Waite |

(Continued)

FOREIGN PATENT DOCUMENTS

| BE | 409374 A | 6/1935 |
|---|---|---|
| DE | 668666 C | 8/1938 |

(Continued)

OTHER PUBLICATIONS

International Search Report and Written dated Jan. 20, 2014 from corresponding PCT Application No. PCT-US2013-053340.

*Primary Examiner* — Fenn Mathew
*Assistant Examiner* — Jennifer Castriotta
(74) *Attorney, Agent, or Firm* — Wolf, Greenfield & Sacks, P.C.

(57) ABSTRACT

A gasket for a compressed gas cylinder arranged to operate with a gas cylinder having a neck with a top surface around a gas outlet and a side surface extending downwardly from the top surface. The gasket may include an upper portion arranged for positioning on the top surface of the cylinder and for making a seal with the top surface, and a lower portion extending downwardly from the upper portion and around the side surface of the neck of the cylinder, such that the lower portion is arranged to make a seal with the side surface of the gas cylinder. Face and gland seals may be established by the gasket with an opening that receives the gasket and an associated cylinder neck.

11 Claims, 20 Drawing Sheets

(56) References Cited

U.S. PATENT DOCUMENTS

| | | | |
|---|---|---|---|
| 2,336,708 A | 12/1943 | Ward | |
| 2,367,077 A | 1/1945 | Ward | |
| 2,496,258 A | 2/1950 | Alexander | |
| 2,705,578 A | 4/1955 | Burns | |
| 3,191,533 A | 6/1965 | Vandenberg | |
| 3,200,094 A | 8/1965 | Levinson et al. | |
| 3,272,404 A | 9/1966 | Graves et al. | |
| 3,327,899 A | 6/1967 | Reynolds et al. | |
| 3,435,998 A * | 4/1969 | Kahn | 222/402.24 |
| 3,709,395 A * | 1/1973 | Brennan et al. | 215/247 |
| 3,883,043 A | 5/1975 | Lane | |
| 3,976,221 A | 8/1976 | Martin et al. | |
| 4,011,971 A | 3/1977 | Haydon | |
| 4,143,678 A | 3/1979 | Sugimura et al. | |
| 4,253,583 A * | 3/1981 | Lynch | 220/319 |
| 4,473,174 A | 9/1984 | Heuser | |
| 4,475,576 A | 10/1984 | Simon | |
| 4,541,537 A * | 9/1985 | Sailor | 215/274 |
| 4,582,207 A * | 4/1986 | Howard et al. | 215/247 |
| 4,595,121 A | 6/1986 | Schultz | |
| 4,674,662 A | 6/1987 | Bergstrom et al. | |
| 4,691,482 A | 9/1987 | Heinemann et al. | |
| 4,694,850 A | 9/1987 | Fumino | |
| 4,706,847 A | 11/1987 | Sankey et al. | |
| 4,773,553 A * | 9/1988 | Van Brocklin | 215/272 |
| 4,856,680 A | 8/1989 | Sitton | |
| 4,867,209 A | 9/1989 | Santoiemmo | |
| 4,932,561 A | 6/1990 | Boxall | |
| 4,976,894 A | 12/1990 | Robinson | |
| 4,982,879 A | 1/1991 | Corrando et al. | |
| 4,984,711 A | 1/1991 | Ellis | |
| 5,020,395 A | 6/1991 | Mackey | |
| 5,031,799 A | 7/1991 | Owen | |
| 5,111,946 A * | 5/1992 | Glanz | 215/247 |
| 5,139,179 A | 8/1992 | Cecil | |
| 5,163,909 A | 11/1992 | Stewart | |
| 5,180,081 A | 1/1993 | McCann | |
| 5,395,012 A | 3/1995 | Grill et al. | |
| 5,407,096 A | 4/1995 | Smith | |
| 5,413,230 A | 5/1995 | Folter et al. | |
| 5,413,247 A | 5/1995 | Glasa | |
| 5,590,696 A | 1/1997 | Phillips et al. | |
| 5,947,172 A | 9/1999 | Glotin | |
| 6,371,173 B1 | 4/2002 | Liebmann, Jr. | |
| 6,607,100 B2 | 8/2003 | Phelps et al. | |
| 6,752,965 B2 * | 6/2004 | Levy | 422/570 |
| 6,789,698 B2 | 9/2004 | Gloor et al. | |
| 6,843,388 B1 | 1/2005 | Hollars | |
| 7,056,179 B2 | 6/2006 | Courtney | |
| 7,712,637 B2 | 5/2010 | Lambrecht | |
| 7,909,188 B2 * | 3/2011 | Kim et al. | 215/320 |
| 7,980,276 B2 * | 7/2011 | Py | 141/11 |
| 8,033,431 B2 | 10/2011 | Sommerfield et al. | |
| 8,225,959 B2 | 7/2012 | Lambrecht | |
| 2003/0111135 A1 | 6/2003 | Vallon | |
| 2006/0197290 A1 | 9/2006 | Vallon | |
| 2011/0016692 A1 | 1/2011 | Hollars | |

FOREIGN PATENT DOCUMENTS

| | | |
|---|---|---|
| DE | 2730125 A1 | 1/1979 |
| DE | 29712913 U1 | 11/1998 |
| EP | 1468788 A1 | 10/2004 |

\* cited by examiner

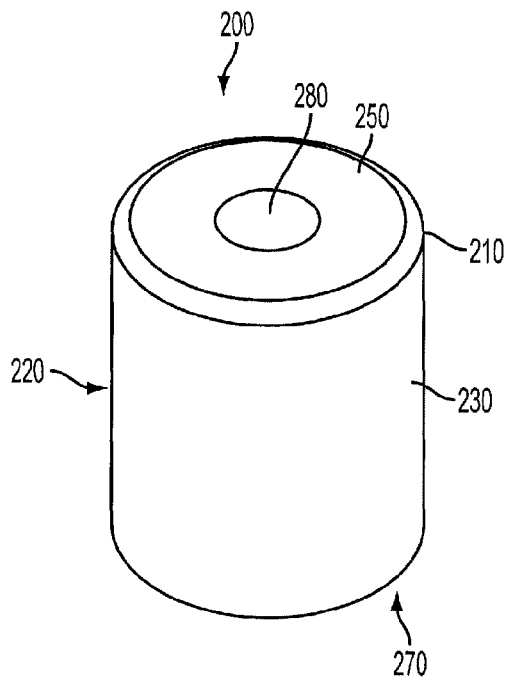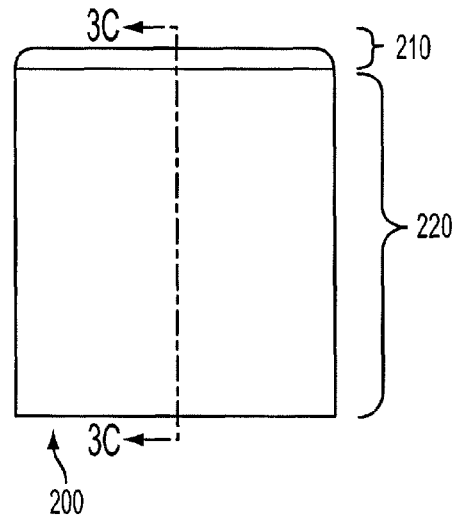
FIG. 3A  FIG. 3B
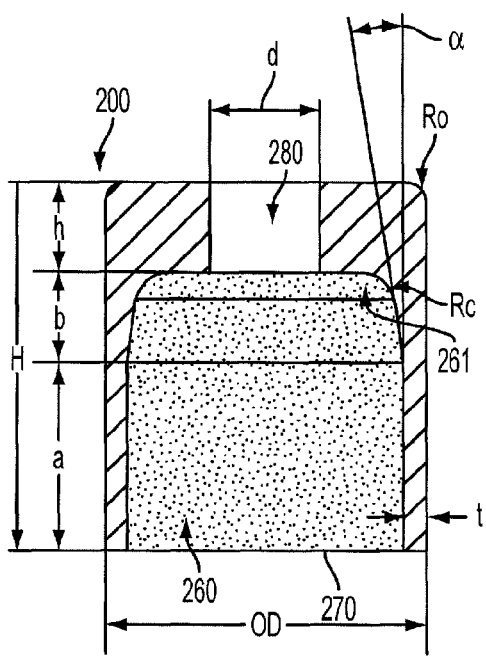
FIG. 3C

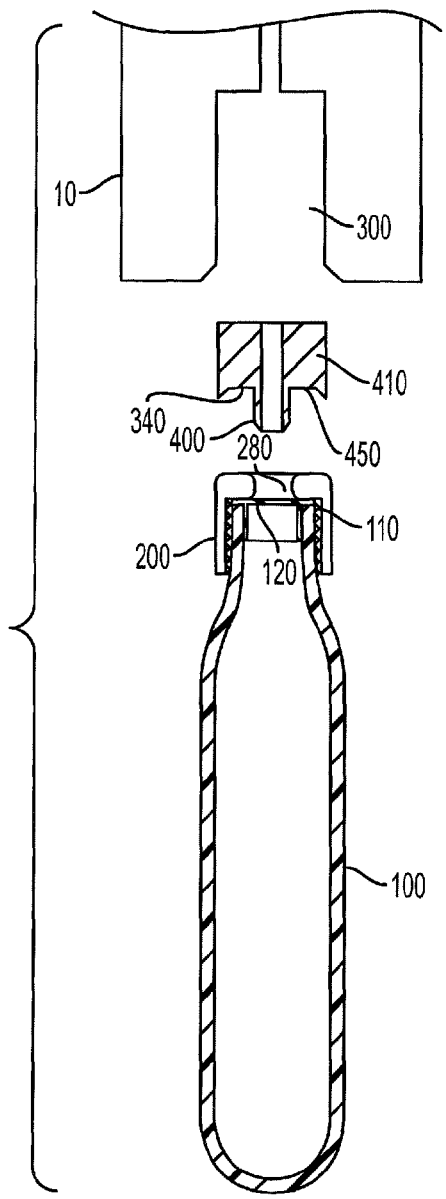
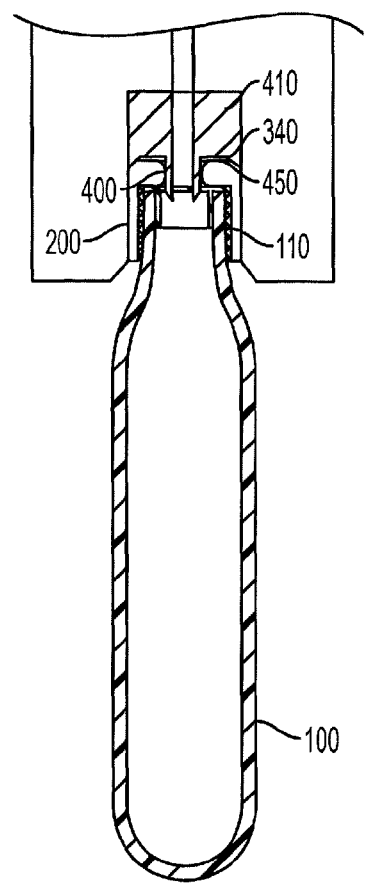
FIG. 10A
FIG. 10B

METHOD AND APPARATUS FOR GAS CYLINDER SEALING

BACKGROUND

1. Field of Invention

This disclosure relates gaskets or sealing members for use with compressed gas canisters, cylinders or containers.

2. Related Art

The coupling of a compressed gas cylinder, canister or other container (herein referred to as a cylinder) with gas delivery mechanisms that use gas supplied by the cylinder often involves an O-ring or other seal element. Such seal elements are used to help prevent leakage of gas, and are described in U.S. Pat. No. 4,694,850, for example.

SUMMARY

Many commercially available compressed gas cylinders are necessarily high pressured and relatively low volume, and thus any loss of gas in the process of connecting the cylinder to a gas delivery mechanism is undesirable. One or more embodiments of the invention described herein provide for an improved seal between a cylinder and the gas delivery mechanism. The seal may be operable to prevent the initial loss of gas as the cylinder is being opened via a piercing element and further provide a long lasting seal that resists the loss of gas over long periods of time, such as during storage of the gas delivery mechanism. Also, because a gasket may be mounted on or otherwise coupled to the cylinder and not the gas delivery mechanism, the gasket may be replaced with a new gasket when a new cylinder is installed, thus eliminating any chance wear due to repeated use.

In accordance with an aspect of the invention, a gasket for a compressed gas cylinder is provided. The gasket may be arranged to operate with a gas cylinder having a neck with a top surface around a gas outlet and a side surface extending downwardly from the top surface, e.g., the neck may have a generally cylindrical shape. The gasket may include an upper portion arranged for positioning on the top surface of the cylinder and for making a seal with the top surface, and a lower portion extending downwardly from the upper portion and around the side surface of the neck of the cylinder, such that the lower portion is arranged to make a seal with the side surface of the gas cylinder.

The upper and lower portions of the gasket may be arranged in different ways, e.g., the lower portion may include a continuous sidewall portion, such as portion having a cylindrical or frustoconical shell shape, arranged to extend around the side surface of the neck of the cylinder and to form a seal with the side surface. In some embodiments, the upper portion and the lower portion may be arranged to form a gas-tight seal with respective portions of the neck. The upper portion may include an upper opening near a center of the upper portion arranged for positioning over the gas outlet, e.g., to allow a piercing element to freely pass to the gas outlet of the cylinder. Alternately, the upper portion may cover the gas outlet, and a piercing element, if used, may pierce the upper portion. The upper portion may make a seal with a piercing element, e.g., a gland or face seal by engaging an outer surface of a piercing element. The upper portion may include a torus or other toroidally-shaped element, e.g., an o-ring shaped portion at the upper portion. The upper portion may include one or more surface features on a face of the upper surface, e.g., one or more bumps, ridges, grooves, and/or rings.

The lower portion may be attached to, and extend downwardly from, an outer periphery of the upper portion, e.g., the lower portion may extend downwardly from an outer edge of the upper portion. In some embodiments, the lower portion may have a cylindrical shell shape, e.g., may have a sidewall with a wall thickness of about 0.20 inches. Thus, the upper and lower portions may together form a cup-shaped interior space arranged to receive a part of the neck of the cylinder, e.g., the upper and lower portions may form a type of cap that fits over the cylinder neck. The cup-shaped interior space may be tapered to have a smaller size near the upper portion than near a bottom end of the lower portion, e.g., for applications where the neck has a tapered upper end. The gasket may also include a ring or other retainer element that extends around a part of the lower portion and is arranged to hold the gasket on the neck. The ring may extend only around the lower portion, or may also extend around a part of the upper portion.

The gasket may be combined with a gas cylinder, e.g., may be permanently or removably attached to a neck of the gas cylinder. For example, the gasket may be molded onto the neck of the cylinder, adhered to the neck, welded to the neck, and so on. A gas cylinder receiver may be arranged with an opening sized and shaped to receive the gasket and make a seal with the upper portion and the lower portion of the gasket, e.g., a face seal with the upper portion and a gland seal with the lower portion. The receiver opening may include a piercing element arranged to pierce the gas outlet of a gas cylinder, or a piercing element may be attached to the gas cylinder or may be an independent part. The receiver opening may include a sidewall with a tapered outer portion and a cylindrical inner portion, e.g., so that the sidewall forms a gland seal with the lower portion of the gasket when the gasket and neck are introduced into the opening. The receiver opening may also include a bottom surface arranged to form a face seal with the upper portion of the gasket.

In another aspect of the invention, a method for engaging a gas cylinder with a gas cylinder receiver (having a receiving opening with a sidewall and a bottom surface) includes providing a gas cylinder with a gasket attached to a neck of the gas cylinder. The neck may have a top surface around a gas outlet of the gas cylinder and a side surface extending downwardly from the top surface, and the gasket may include portions on the top surface and side surface of the neck. The neck of the gas cylinder may be inserted into the receiving opening of the gas cylinder receiver such that an upper portion of the gasket on the top surface makes a seal (e.g., a face seal) between the top surface of the gas cylinder and the bottom surface of the receiver opening, and such that a lower portion of the gasket makes a seal (e.g., a gland seal) between the side surface of the gas cylinder and the sidewall of the receiving opening.

In some embodiments, the step of inserting includes sliding the lower portion of the gasket axially along the sidewall of the receiving opening. In some cases, inserting the neck includes causing the lower portion to pull the upper portion downwardly relative to the top surface. For example, friction between the gasket lower portion and the sidewall of the receiver opening may pull the lower portion downwardly relative to the cylinder neck, which may cause the top portion to be pulled into contact with the top surface and properly positioned with respect to the top surface. The receiver opening may be tapered to define a larger opening at an outer position located farther from the bottom surface than at an inner position located nearer the bottom surface. A piercing element of the cartridge receiver may pierce the gas outlet of the gas cylinder, e.g., by passing through a cap positioned at the gas outlet of the cylinder. Insertion of the neck may also include making a seal between the piercing element and the upper portion of the seal, e.g., a conical outer surface of the piercing element may contact an upper opening of the upper portion of the gasket.

In another aspect of the invention, a method for coupling a compressed gas container to a receiving opening of a gas delivery device includes selecting a container having an elongate body and a cylindrical neck defined by a lower lateral sidewall surface and an upper end face oriented perpendicular to said lateral wall. At least a portion of both the lateral sidewall and upper end of the gas cylinder may be encapsulated or otherwise coated with an elastomeric material, e.g., to form a gasket at the top and side surfaces of the neck. A receiving opening may be selected or otherwise provided such that when the encapsulated neck is inserted into the opening, the encapsulated neck initially forms a gland seal between the lower lateral sidewall and an interior wall of the opening and such that when the container neck is fully inserted into the opening, the upper end face forms a face seal against a bottom surface of the opening. The end face of the cylinder may be pierced with insertion of the neck into the receiver opening, and a release of compressed gas from the container may be minimized, e.g., by a gland seal at the side surface and/or a face seal at the top surface of the neck.

The gasket may be arranged to have any suitable features, such as those discussed above, including an upper opening and a raised semi-circular ring surface with a radius of curvature at an upper portion of the gasket. The gasket and the receiver opening may be arranged to have a face and/or gland seal that is strengthened as the neck is further advanced into the receiver opening, e.g., the upper end face may deform to conform with said bottom surface of the receiver opening thereby forming a stronger seal.

In another illustrative embodiment, a gasket for a neck of a compressed gas cylinder for forming a seal with a receiving opening includes a cylindrical sidewall member defining an interior cavity and a lower opening, and an upper portion with an upper opening arranged perpendicularly to the sidewall member. The interior cavity may be tapered adjacent the upper portion in conformity with a distal tapered end of a neck of a gas cylinder and the sidewall member may be operable to form a gland type seal with a sidewall of the receiving opening while the upper portion is operable to make a face seal with a bottom surface of said opening. In some arrangements, after an initial formation of the gland and face seals, the neck may be advanced further into the opening for a distance sufficient to puncture the neck by a piercing element prior to the gasket or other portion preventing further advancement of the neck into the opening.

These and other aspects of the invention will be apparent from the following description and claims.

BRIEF DESCRIPTION OF THE DRAWINGS

Aspects of the invention are described below with reference to the following drawings in which like numerals reference like elements, and wherein:

FIG. 3a shows a perspective view of a gasket in another embodiment having a flat upper face;

FIG. 3b shows a side view of the FIG. 3a embodiment;

FIG. 3c shows cross-sectional view of the FIG. 3a embodiment along the line A-A of FIG. 3b;

Figure 8A:
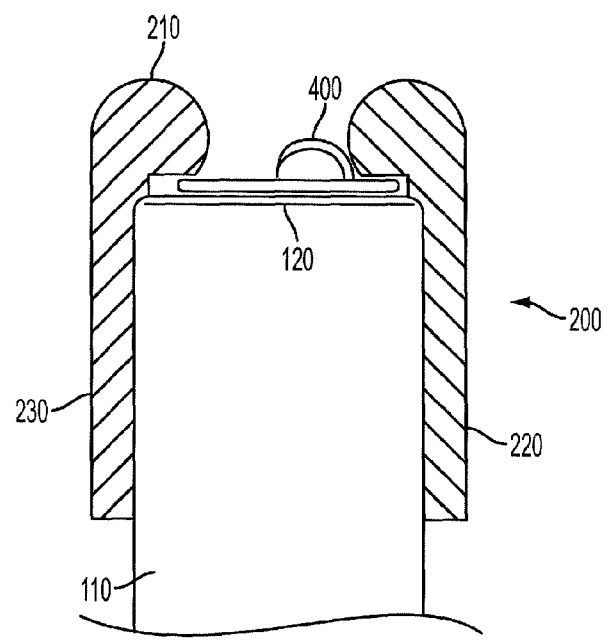
Figures 9A, 9B:
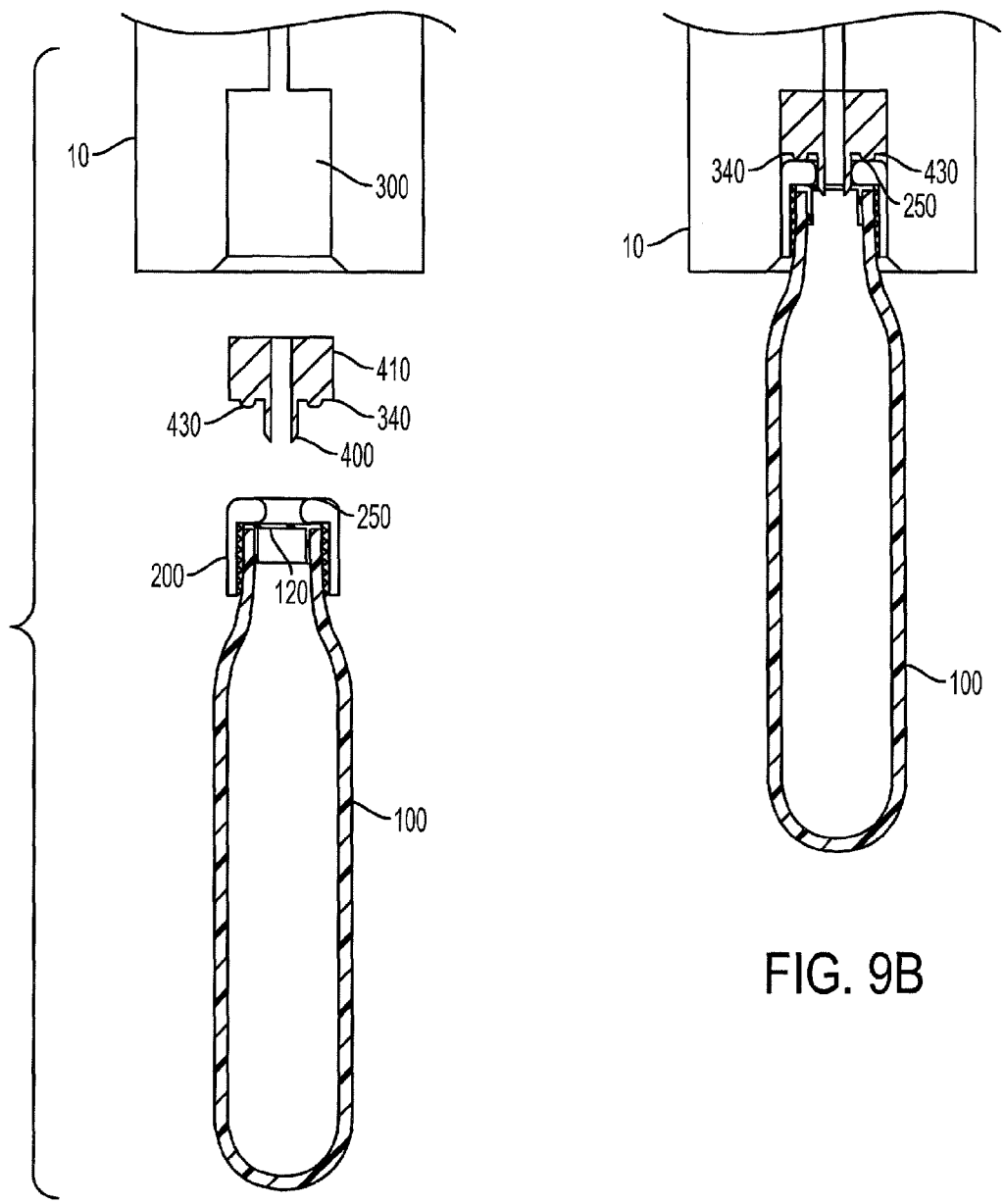
Figures 11A, 11B:
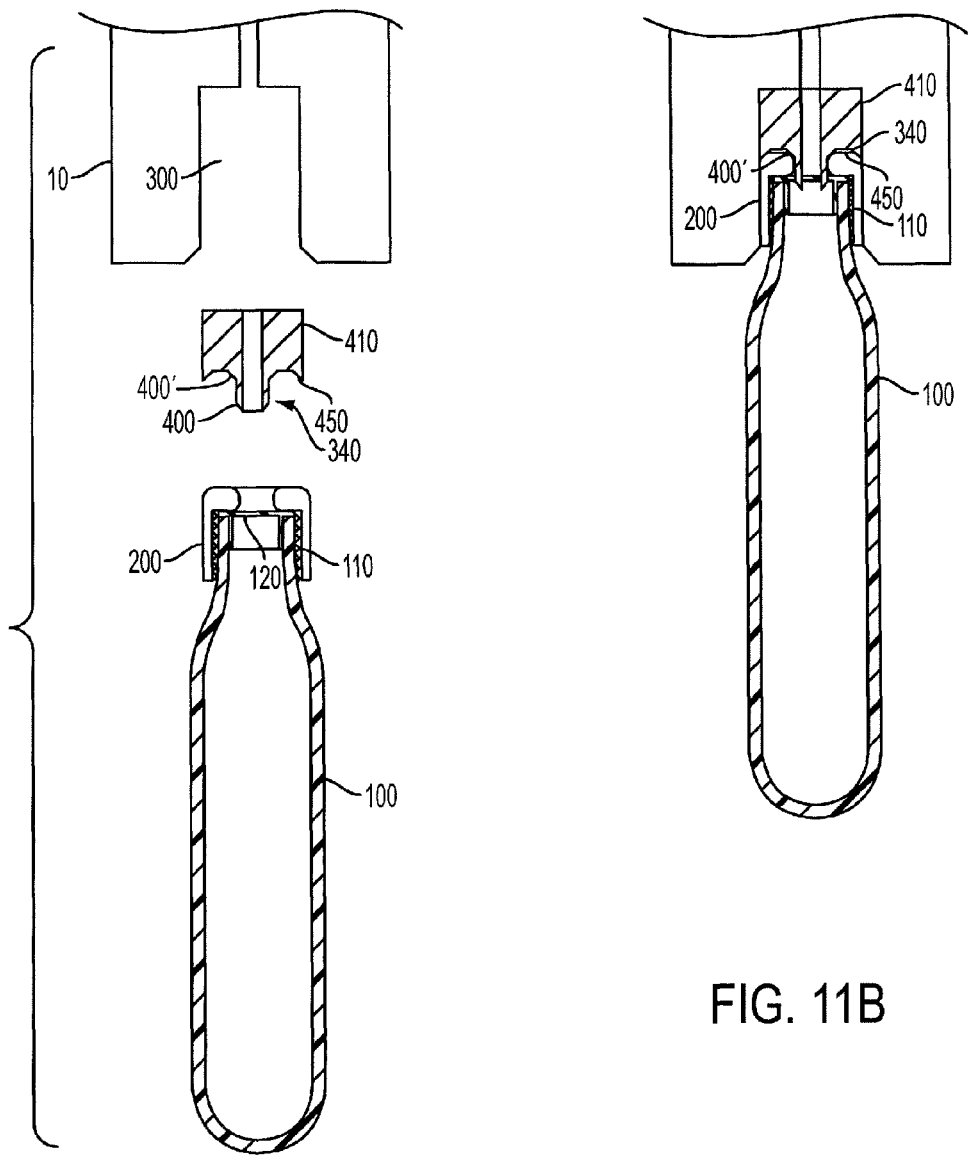
Figures 12A, 12B:
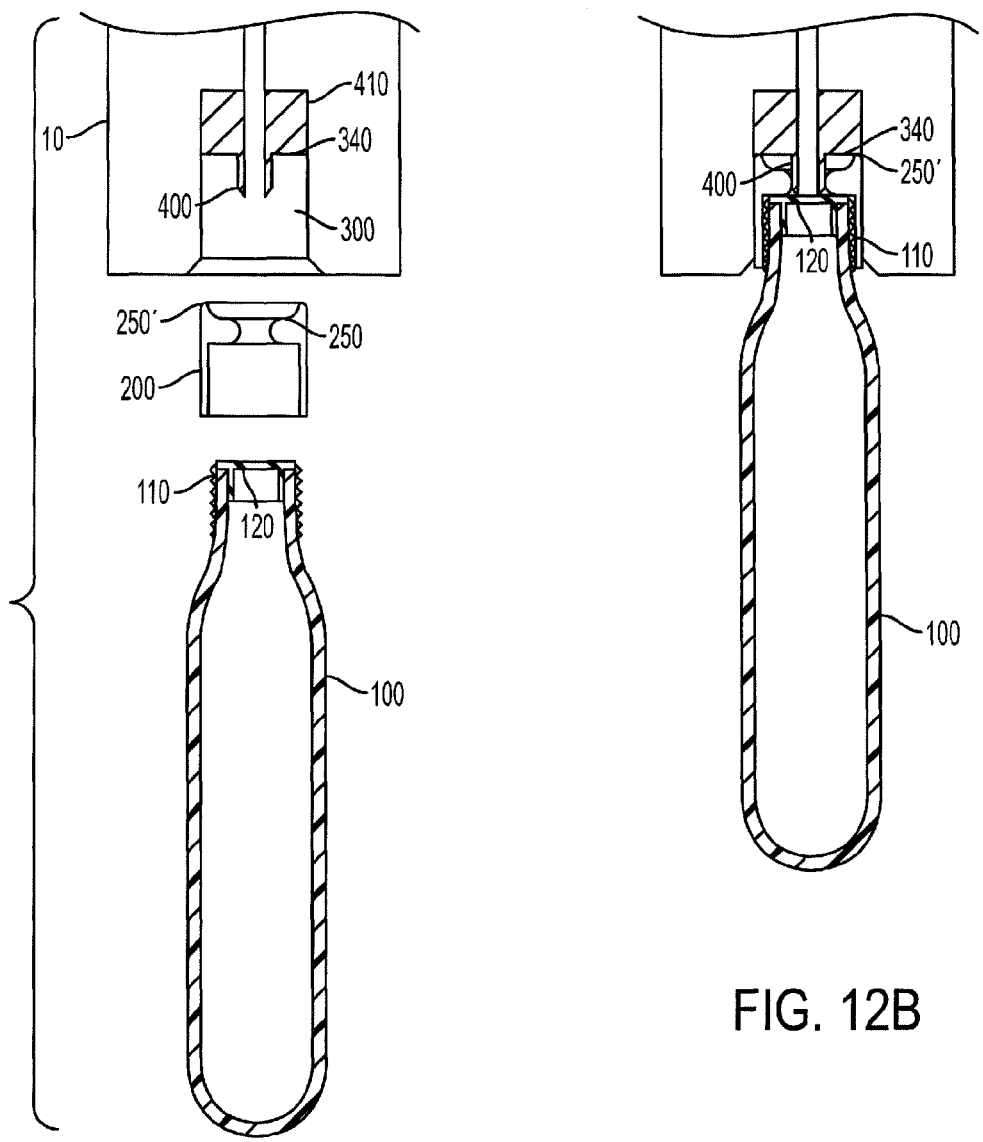
Figures 13A, 13B:
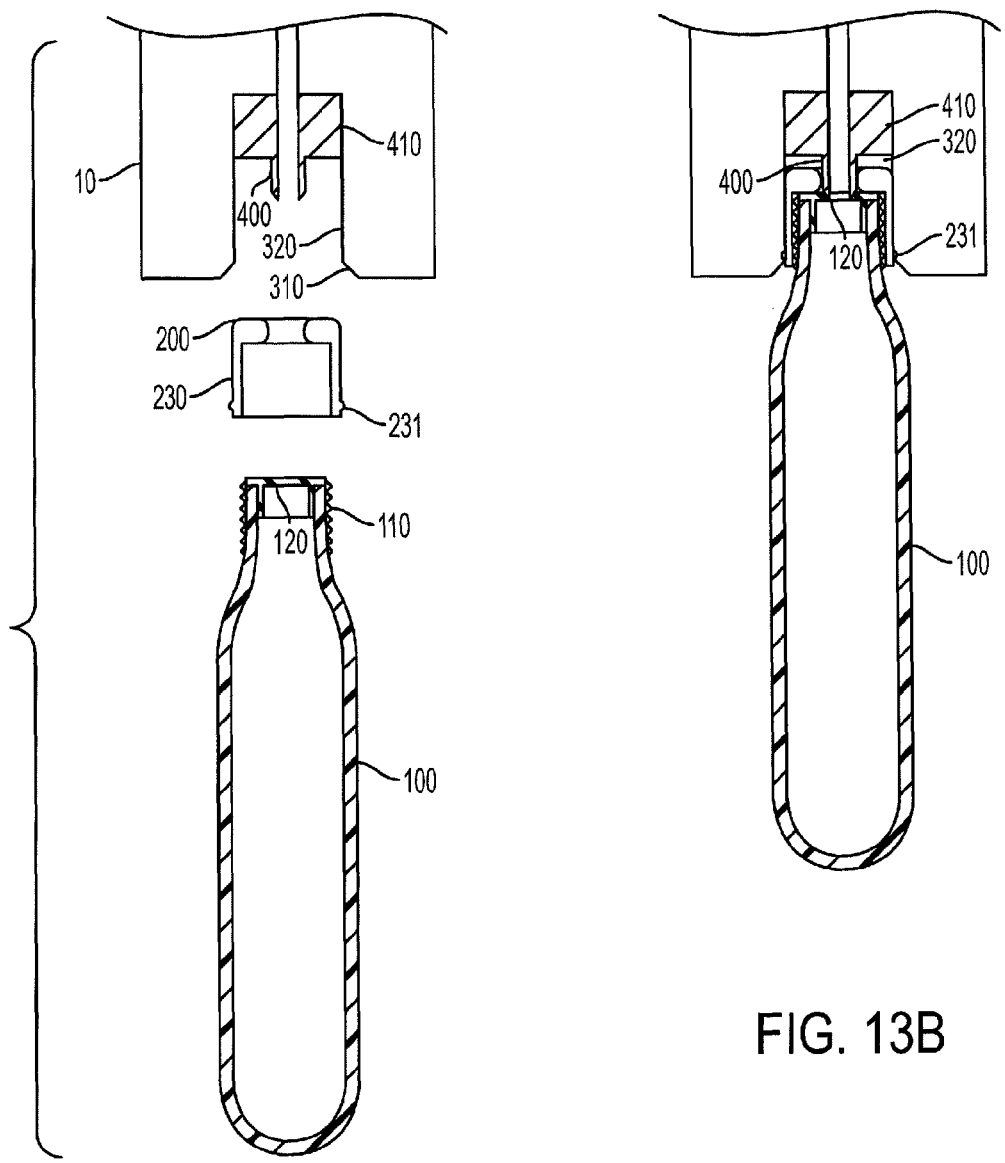
Figure 14A:
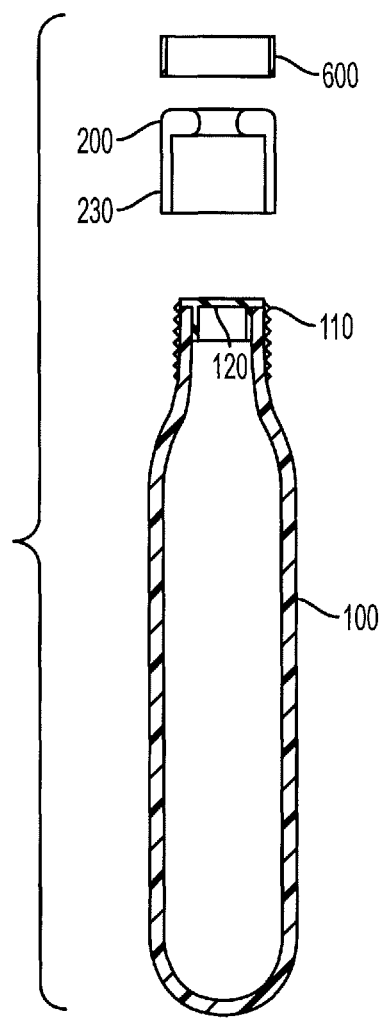
Figure 14B:
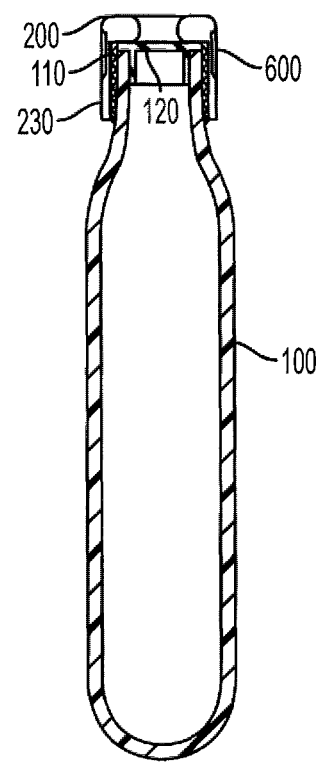
Figure 15A:
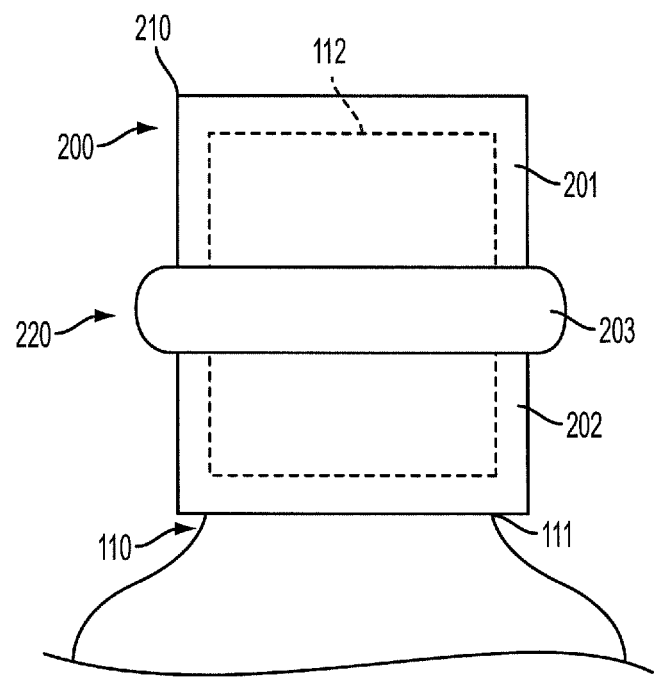
Figure 15B:
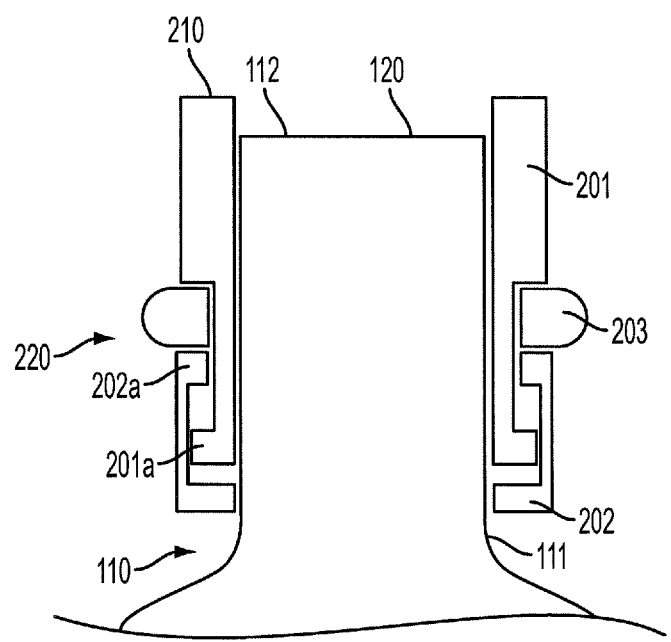

Figures shows 7a and 7b show a side view and a cross-sectional view of an illustrative gas cylinder receiver having a threaded screw-type cylinder advancement assembly;

FIG. 8a shows a cross-sectional view of a gasket and cylinder arrangement including a piercing element;

FIGS. 9a and 9b show exploded and assembled cross sectional views of an embodiment including a piercing element with a surface having a ridge to engage with the face of the gasket;

FIGS. 10a and 10b show exploded and assembled cross sectional views of an embodiment including a piercing element with a ramp arranged near a sidewall of the receiver opening to engage with the face of the gasket;

FIGS. 11a and 11b show exploded and assembled cross sectional views of an embodiment including a piercing element with ramps arranged near a sidewall of the receiver opening and near a piercing component to engage with the face of the gasket;

FIGS. 12a and 12b show exploded and assembled cross sectional views of an embodiment including a raised annular ridge extending from an upper surface of a gasket;

FIGS. 13a and 13b show exploded and assembled cross sectional views of an embodiment including a raised annular ridge at a lateral sidewall of a gasket;

FIGS. 14a and 14b show exploded and assembled cross sectional views of an embodiment including a ring positioned over a gasket; and FIGS. 15a and 15b shows a side view and cross sectional view of an embodiment including top and bottom rings that sandwich a resilient element.

DETAILED DESCRIPTION

Various aspects of the invention are described with reference to embodiments of a gasket for interacting with at least a portion of a neck of a gas cylinder, e.g., to provide both a lateral, or side, gland seal and a face seal. Some embodiments are able to provide a gland seal that allows for axial and/or rotational translation of a cylinder neck within a receiving opening while still maintaining a gas-tight seal to prevent or otherwise resist the unwanted release of compressed gas. Maintaining a seal while permitting axial translation may be important in some applications, e.g., to allow the cylinder neck to be advanced against a piercing element that creates an opening in a cap or end piece at the gas outlet of the cylinder neck as the gas cylinder moves axially relative to the piercing element. As a result, gas leakage may be resisted during the cylinder piercing process, if piercing is used. Further embodiments may provide for a face sealing component of the gasket that provides a face seal with a receiver surface even with movement of the neck and receiver surface relative to each other, whether in rotation or axial translation. Thus, a face seal may resist gas leakage during cylinder piercing, either alone or in combination with a gland seal. It should be understood that various aspects of the invention may be used alone and/or in any suitable combination with each other, and thus various embodiments should not be interpreted as requiring any particular combination or combinations of features. Instead, one or more features of the embodiments described may be combined with any other suitable features of other embodiments. Thus, for example, aspects of the invention may relate to a gasket with a face seal arrangement that may be used alone, or in combination with a side or gland seal arrangement, and vice versa.

Figures 1, 1A:
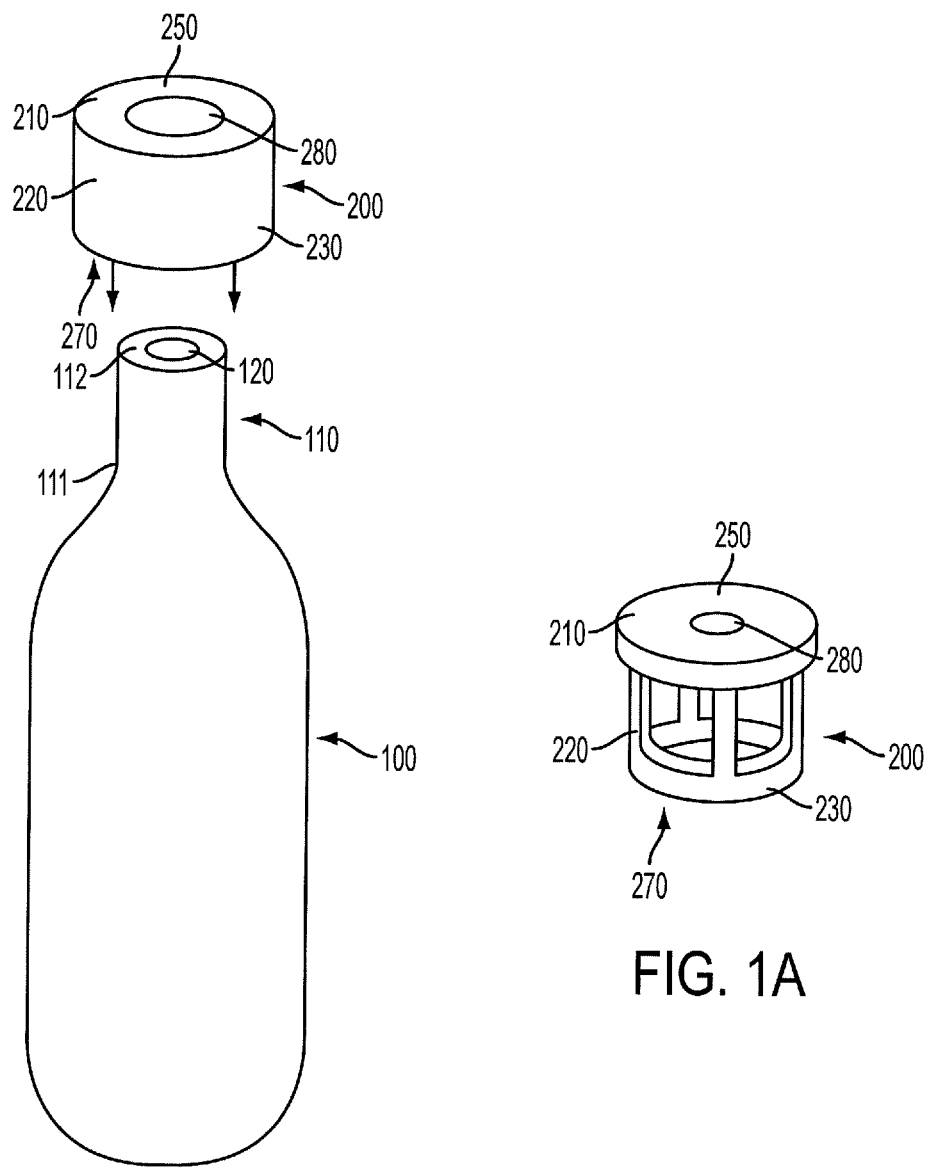
FIG. 1 shows an exploded view of a gas cylinder and gasket in an illustrative embodiment.
FIG. 1a shows a gasket having a ring-shaped sidewall portion and legs connecting to an upper portion in an illustrative embodiment.

As noted above, aspects of the invention relate to a gasket for use with a gas cylinder, e.g., a gasket that is arranged to engage with the neck of a cylinder. FIG. 1 is a perspective view of a compressed gas cylinder 100 and gasket 200 in an illustrative embodiment. As will be understood, the size, shape, material and/or other characteristics of a gasket arranged to operate with a gas cylinder neck will depend at least in part on the shape, size, configuration, etc. of the gas cylinder with which the gasket is to be used. In the embodiments described herein, gas cylinders 100 have a neck 110 of a generally cylindrical shape, i.e., the neck 110 has a generally flat or beveled top surface 112 surrounding a gas outlet 120 and a cylindrically-shaped side surface 111 extending downwardly from the top surface 112. However, aspects of the invention may be used with other gas cylinder neck arrangements, such as necks have a frusto-conically shaped side surface 111, necks having a rounded or pointed top surface 112, and so on. Also although the depicted cylinder 100 is relatively small and designed to be easily portable and disposable (e.g., having an overall length of about 3.5 inches and a diameter of about 1 inch), aspects of the invention may be used with larger or smaller and/or differently shaped gas storage containers. Thus, the term gas cylinder as used herein refers generically to a container arranged to store and release gas under pressure. Also, in this embodiment, the neck 110 has a diameter of about 0.375 inches and a length of about 0.5 inches, but other sizes are possible. Moreover, although the neck 110 is shown unthreaded in this embodiment, the neck can be threaded, unthreaded or have any other surface shape or features (such as a bayonet coupling), e.g., for coupling with a gas cylinder receiver or other coupling member. The neck 110 in this embodiment includes a gas outlet 120 that includes a cap or plug that is fitted in an opening of the neck 110 and can be opened via piercing with a piercing element (such as a sharpened or blunt lance) to release gas in the cylinder through the gas outlet 120. Of course, other arrangements for the gas outlet 120 are possible, such as an openable valve, a threaded cap or plug, and so on.

The gas cylinder may be employed with a gas delivery system that uses gas supplied by the cylinder for any suitable purpose. For example, embodiments have been found useful with systems that introduce an inert or otherwise minimally-reactive gas into a wine bottle for dispensing and storing wine as described in U.S. Pat. No. 7,712,637. However, other applications are possible, such as tire inflation, beverage carbonation, etc. Exemplary compressed gasses contained in a cylinder may include air, oxygen, carbon dioxide, argon, neon, helium, nitrogen, and mixtures thereof. Pressure ranges for such cylinders can range from around 1000 psi to around 3500 psi, though most commercial cylinders of the size and shape shown in FIG. 1 are at 2600 psi or 3000 psi.

The gasket 200 shown in FIG. 1 is arranged to engage with the neck 110 of the cylinder 100 to provide one or more seals with the neck 110 and a cylinder receiver opening of a gas delivery system (not shown). The seal(s) may be a gas-tight seal, e.g., a seal that resists the unwanted leakage or other flow of gas along a surface of the neck 110. Thus, a gas-tight seal need not be completely leak-free, but rather suitably resistant to gas leakage so as to be considered suitable for use in employing gas provided by the gas cylinder. In this illustrative embodiment, the gasket 200 has an inverted cup-like shape defined by an upper portion 210 and lower portion 220. The lower portion 220 in this illustrative embodiment includes a cylindrical sidewall member 230 that defines a cup-shaped interior cavity and a lower opening 270 for receiving the neck 110 of a cylinder. The interior cavity 260 can be tapered, contain a fillet, or otherwise shaped to suitably engage the neck 110 of the cylinder 100, e.g., the interior cavity 260 may include a tapered section near the upper portion 210 to receive and conform to a tapered portion at the distal end of the neck, i.e., near the top surface of the cylinder neck. Thus, the gasket 200 may be fitted over the neck 110 of the cylinder 100 as a sleeve or cover with the lower portion 220 having a part arranged to sealingly engage with the side surface 111 of the neck 110 and/or the upper portion 210 having a part arranged to sealingly engage with the top surface 112 of the neck 110.

The upper portion 210 may have a radially extending portion that defines a face 250 and include an upper opening 280 arranged to be positioned over or adjacent to the gas outlet 120, e.g., to allow gas to flow from the outlet 120 without impediment by the gasket 200. The upper opening 280 may also be arranged to receive and/or engage with a piercing element, such as a lance. That is, a piercing element (not shown) may pass through the upper opening 280 without contacting the gasket 200 to pierce the gas outlet 120. Alternately, the gasket 200 may contact the piercing element, e.g., to form a seal with the piercing element, to help position the gasket 200 with respect to the piercing element, to help guide the piercing element into contact with the gas outlet 120, and so on.

In one aspect of the invention, the gasket is arranged to form a gland or side seal at a side surface 111 of the neck 110 and a face seal with a top surface 112 of the neck 110. This arrangement may make the gasket 200 particularly effective in helping to resist gas leakage, e.g., because the two different seal types may cooperate together to help resist gas leakage during piercing of the cylinder outlet 120 and/or during other relative movement of the cylinder 100 and a cylinder receiver. For example, and as is discussed in more detail below, a part of the lower portion 220 may form a gland or side seal with the neck side surface 111 (as well as with a sidewall of a receiving opening), thus resisting gas leakage even if the lower portion 220 and the side surface 111 (or opening sidewall) slide relative to each other. As a result, a seal may be established and maintained as the neck 110 is slid into a receiving opening, e.g., to puncture the gas outlet 120, prior to the face 250 of the upper portion 210 making contact and forming a seal with the receiving opening. Accordingly, gas released during the puncture process may be contained and leakage resisted prior to the upper portion 210 forming a seal with the receiving opening and/or the top surface 112 of the cylinder 100. However, once the neck 110 is fully received into the receiver opening, the upper portion 210 may contact the receiver opening, and form a face seal with the receiver opening and the top surface 112 of the gas cylinder.

As is discussed in more detail below, the gasket 200 may be arranged in a variety of different ways to provide characteristics, such as a gland and face seal combination. To provide this combination, the lower portion 220 and upper portion 210 may be connected together in any suitable way, e.g., like that shown in FIG. 1 or in other configurations. In an alternative embodiment shown in FIG. 1a, the gasket 200 has a lower portion 220 that includes a sidewall portion 230 having a continuous ring at a lower end that is connected to the upper portion 210 by a plurality of parallel legs. The continuous ring part may provide a continuous sidewall portion suitable to provide a gland seal with the side surface 111 at a radially inner side and with a receiver opening at a radially outer side of the sidewall portion. The legs may help maintain the ring part and the upper portion 210 in a desired position on the neck 110 and relative to each other. For example, and as described in more detail below, insertion of the neck 110/gasket 200 combination in to a receiving opening of a gas delivery device may tend to pull the lower portion 220 downwardly along the side surface 111 of the neck 110 (e.g., because of friction with the receiving opening sidewall). By having the lower portion 220 connected to the upper portion 210, the lower portion 210 (such as the ring) may be maintained in a desired location on the neck and/or the upper portion 210 may be drawn downwardly and into contact with the top surface 112 of the neck, helping to position the upper portion 210 to establish a seal. Of course, the arrangement of FIG. 1a is only one example, and the lower portion 220 could be arranged in different ways, e.g., the straight legs could be replaced with resilient elements to provide a resilient bias to urge the lower portion 220 and upper portion 210 together in the presence of a force that draws the two components apart, replaced with a web or mesh component, or with "X" shaped bars, etc.

Figures 2A, 2B:
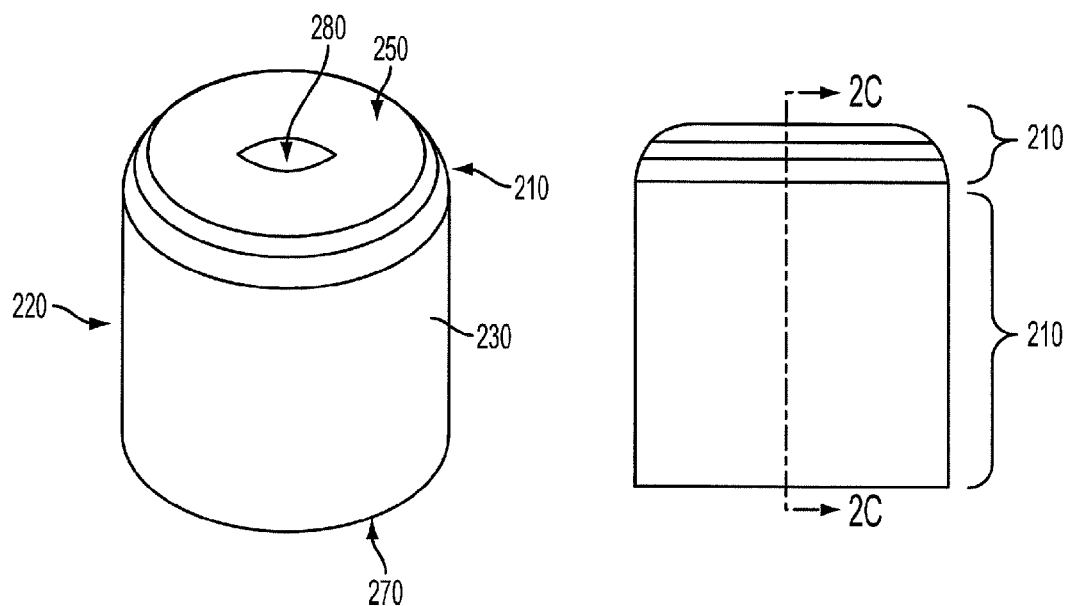
FIG. 2a shows a perspective view of a gasket in another embodiment having a toroidally-shaped upper portion.
FIG. 2b shows a side view of the FIG. 2a embodiment.
Figure 2C:
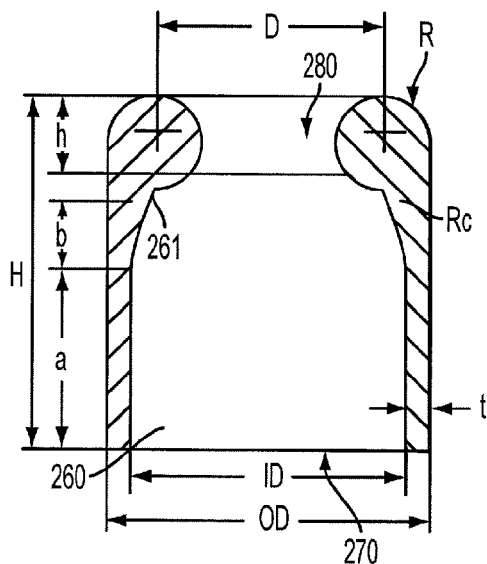
FIG. 2c shows a cross-sectional view of the FIG. 2a embodiment along the line B-B of FIG. 2b.

The upper and lower portions of the gasket may be configured in different ways to provide a gland seal at the side surface and a face seal at the top surface of the cylinder neck. FIGS. 2a-2c show perspective, side and cross-sectional views of another illustrative gasket 200 in accordance with aspects of the invention. In this embodiment, the upper portion 210 includes a torus—or other toroidally-shaped portion that defines the upper opening 280 and the upper face 250. Thus, the upper face 250 may be curved surface much like a standard o-ring shape. In this embodiment, the gasket 200 is arranged to operate with a gas cylinder neck 110 like that of FIG. 1, e.g., having a diameter of about 0.375 inches, a length of about 0.5 inches, a slight taper or bevel at the upper part of the side surface 111 near the top surface of about 8-10 degrees, and a beveled top surface 112 forming an angle of about 110-120 degrees with the side surface 111. The gasket 200 has a large diameter D of about 0.246 inches, and the radius R of the torus-shaped portion is about 0.085 inches, but other values, from 0.00 inches to 0.5 inches are possible, as are flat surfaces finished with beveled edges. The gasket may have an outer diameter OD of about 0.375 inches, with the diameter ID of the lower opening 270 being about 0.335 inches, e.g., requiring the gasket to be stretched to fit over the neck 110 of the cylinder 100. The gasket 200 may have a total height of about 0.43 inches, with the upper portion 210 having a height h of about 0.104 inches, A lower part of the lower portion 220 may have a constant thickness t of about 0.020 inches up to a height a (about 0.22 inches), at which point the inner wall of the lower portion 220 may taper inwardly, increasing the wall thickness of the lower portion 220 in this upper area. The tapered portion may be arranged at an angle of about 8-10 degrees relative to the lower part extending from the lower end to the height a and may have an approximate length b of about 0.06 inches. The upper part of the tapered portion may transition to the torus-shaped section by a fillet or curved section 261 having a radius Rc of about 0.05 inches.

FIGS. 3a-c depict another embodiment that incorporates one or more aspects of the invention. Here, the gasket 200 is arranged similarly to that in FIGS. 2a-2c and includes an upper portion 210 having a more flat upper face surface 250 and inner surface compared to the rounded surface defined by the torus-shaped portion shown in FIGS. 2a-c. The dimensions a, H and Rc are similar to that in the FIGS. 2a-2c embodiment, but the height h in this embodiment is about 0.115 inches, and the distance b is about 0.01 inches. Note that the angle α of the tapered section may be about 8-10 degrees, e.g., to match or suitably conform to a taper on the side surface 111 of the neck 110. Also, the upper portion 210 is radiused at its upper, outer periphery with a curve having a radius Ro of about 0.02 inches, and defines the upper opening 280 to have a diameter d of about 0.125 inches. The face 250 need not be flat, however, and may be beveled or curved at its outer edge and/or at the opening 280.

The specified dimensions above are given for illustrative purposes and not to be construed as limiting, and it should be understood that various thicknesses could be used to cooperate with a variety of neck geometries and coupling members or receiving opening geometries. Also, the upper opening 280 could be omitted entirely (e.g., where a piercing element pierces the gasket 200) or otherwise changed in size.

Gaskets in accordance with aspects of the invention may be made of, or otherwise include, an elastomeric material such as a polymer, elastomer, rubber, or composite thereof. Exemplary materials include natural rubber and thermoplastic elastomers and more specifically santoprene, neoprene, silicone, urethane, and butyl rubber. The durometer of the material may be 70-95, but values between 50 and 100 on the shore A scale can be suitable for applications. Those of skill will appreciate that a choice of durometer may require adjustment to component size, shape or other features, such as requiring thicker or thinner components to provide desired sealing strength, a suitable insertion force to engage the cylinder neck/gasket with a receiving opening, etc. As discussed more below, the gasket may include zones of differing durometer and/or material, such as an outer sidewall or sheath having a greater value hardness, stiffness, resilience, etc., than an upper face.

The gaskets disclosed herein are intended for use with threaded and/or unthreaded necks of various containers, and a variety of methods may employed to engage and/or seal gaskets thereto. For example, gaskets may be threaded onto a threaded neck of a cylinder or stretched over a threaded or unthreaded neck, e.g., relying on friction to maintain engagement of the gasket with the cylinder neck. Alternatively, a gasket may be shrink fit, heated, bonded, welded, cross linked, adhered with an adhesive, chemically altered, or transformed to engage a gasket with the neck of the cylinder. Such engagement may form a seal between the gasket and the cylinder, whether a gland seal at the side surface 111 and/or a face seal at the top surface 112, or a seal (such as a gas-tight seal) may be formed by pressure or other force that presses the gasket into suitable contact with the neck. The seal-forming force may be provided when the cylinder/gasket are engaged with a cylinder receiver.

As mentioned above, aspects of the invention relate to gas cylinder engagement with different types of gas cylinder receivers, including those that threadedly engage with a gas cylinder, those that receive a gas cylinder that is slid axially into a receiver opening and others. For example, U.S. Pat. No. 4,867,209; U.S. Pat. No. 5,020,395; U.S. Pat. No. 5,163,909 describe different cylinder engagement arrangements and are hereby incorporated by reference with respect to their teachings regarding mechanisms for engaging a gas cylinder with a cylinder receiver.

Figure 4:
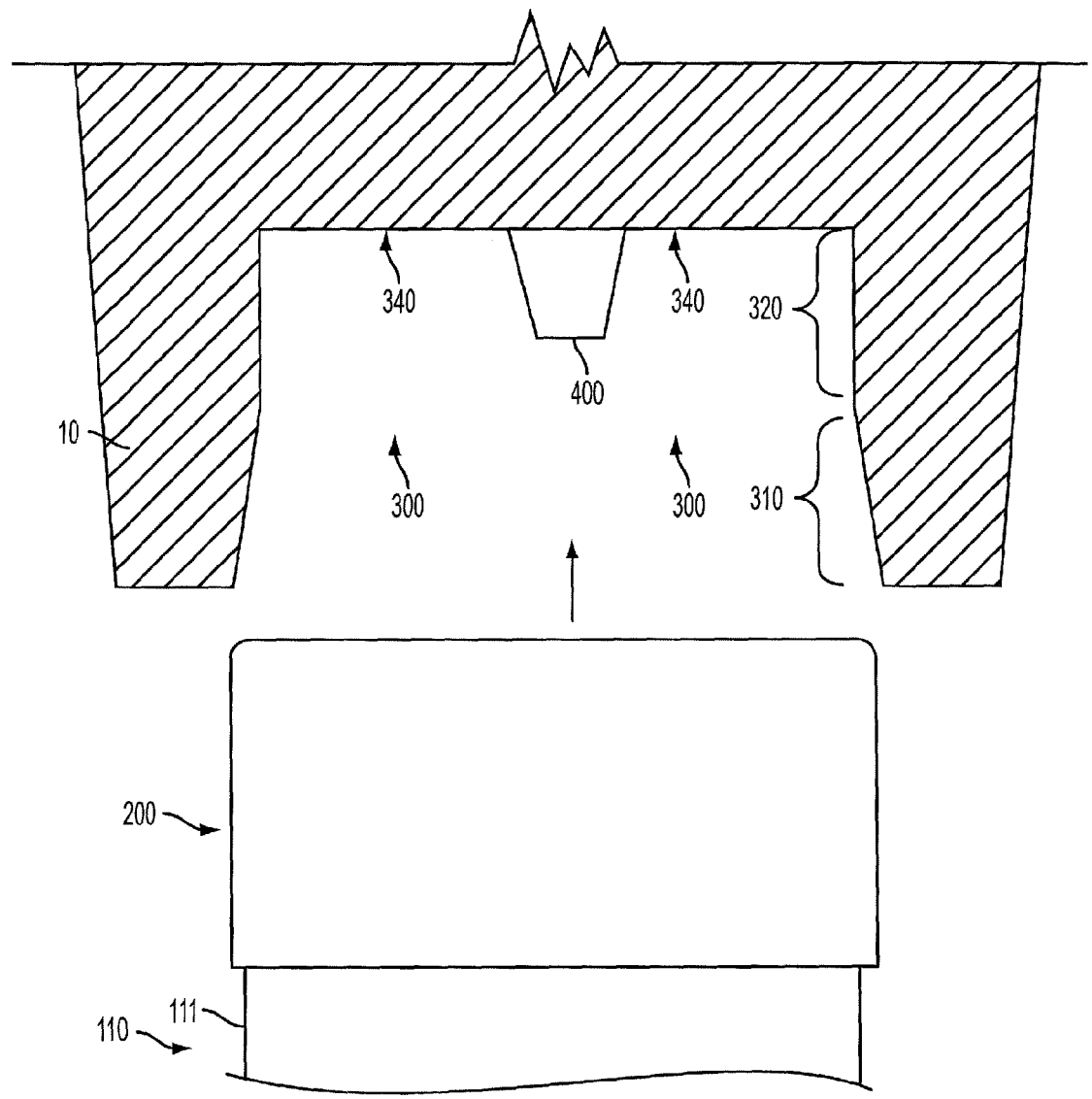
FIG. 4 shows a cross-sectional view of a receiving opening of a gas delivery device and a gas cylinder and gasket to be mated with the receiving opening.

FIG. 4 shows a partial, cross-sectional view of a cylinder receiver 10 that may be part of a gas delivery mechanism or system in a device that uses gas supplied by a cylinder, and may include elements such as a regulator to control a pressure of gas provided, a piercing element to pierce the gas outlet of a cylinder, a valve, spout, nozzle, or hose to control and deliver gas to a desired location, such as a wine bottle, bicycle tire, beverage carbonator, etc. The cylinder receiver 10 includes a receiver opening 300 that is arranged to engage with at least a portion of a gas cylinder neck 110 having an attached gasket 200. In this example, the receiver opening 300 is arranged as a bore or hole 300 that is sized and shaped to receive a gasketed cylinder neck that is axially slid into the hole 300, although other arrangements are possible for the receiver opening 300. For example, the receiver opening 300 may include a clamp arranged so that the neck 110 is received into the opening 300 without resistance and that clamps onto the gasket/neck of the cylinder 100. In another arrangement, the opening may include a threaded element that engages with the cylinder itself or a carrier or holder that holds the cylinder and engages the neck with the opening 300 by threading onto the cylinder receiver 10. In short, a variety of different receiver opening arrangements are possible.

In this illustrative embodiment, while the hole 300 may be uniform in shape, such as a cylindrically-shaped hole with uniform walls, the hole 300 may have a stepped diameter (with one or more smaller diameters located at inner portions of the hole, contain a taper, have a chamfer or other arrangement. As shown in FIG. 4, the hole 300 contains an inner section 320 which is straight or untapered and an outer tapered or chamfered section 310 with the wall(s) of the outer section 310 arranged at an offset angle of about 5-30 degrees relative to the inner section 320. The inner section 320 is adjacent to a bottom surface 340 of the hole 300, which in this embodiment is arranged as a circular, planar surface, but may have any suitable surface features. The bottom surface 340 also carries a piercing element 400 for opening a cylinder, although other arrangements are possible, such as having the piercing element 400 extend through an opening in the bottom surface 340, or having the piercing element carried on the gas cylinder. Of course, in some arrangements, no piercing element may be needed at all, such as those in which the gas cylinder includes a valve.

In this illustrative embodiment, the receiver opening 300 is arranged to operate with a gasket and cylinder configured as in FIGS. 3a-3c. Thus, the opening 300 may have a total depth of about 0.22 inches, a length/depth of the outer tapered section 310 of about 0.122 inches, a diameter of the inner section 320 of about 0.375 inches, and an angle of the tapered section of about 7.5 degrees relative to the straight wall(s) of the inner section 320. The taper of the outer section 310 defines the size of the opening at the outermost portion of the outer section 310 to be larger than the maximum diameter of the gasket 200/neck 110, allowing the gasket 200 to be introduced into the opening 300 relatively easily and without resistance. However, as the gasket 200 and neck 110 are pushed axially into the opening 300, the size of the opening 300 decreases, and the gasket 200 is squeezed between the opening 300 and the neck 110. As a result, the lower portion 220 of the gasket 200 forms a gland or side seal with the sidewalls of the opening 300, particularly at the breakpoint where the outer section 310 meets the inner section 320, and with the side surface 111 of the neck 110. As used herein, a gland or side seal is a seal formed between a part of the lower portion 220 of the gasket and the side surface of the neck 110 of a cylinder and/or between a part of the lower portion 220 and a corresponding portion of a receiver opening 300, and may involve sliding motion between the gasket 200 and the side surface 111 and/or between the gasket 200 and the sidewall of the opening 300, although such motion is not required. With advancement of the neck 110 into the opening 300, the piercing element 400 may penetrate the gas outlet 120, e.g., piercing a cap or cover at the outlet. This piercing releases gas from the cylinder, but the gland seal may resist gas leakage along the neck 110 and/or the opening 300 sidewall. Further advancement may bring the face 250 of the upper portion 210 of the gasket 200 into contact with the bottom surface 340, causing the gasket 200 to form a face seal with the bottom surface 340 and with the top surface 112 of the cylinder 100. In other embodiments, the upper portion 210 may contact the bottom surface 340 prior to axial movement of the cylinder neck 110 being complete, and thus a face seal may be formed prior to, or during, piercing of the gas outlet 120. A face seal is a seal formed between the upper portion 210 of the gasket and the top surface 112 of the cylinder 100 or between the upper portion 210 and the bottom surface 340. A face seal typically will not be created in an area where sliding motion is present between the gasket and the top surface 112 or bottom surface 340.

FIGS. 5a-5d illustrate an exemplary advancement sequence involving a gasketed compressed gas cylinder as described in one or more embodiments herein being inserted into the chamfered opening of a receiver of a gas delivery mechanism. At various stages certain seals will be made as the cylinder is advanced until the gas outlet of the cylinder has been punctured or otherwise opened and until the friction and hardening of the gasket, or other mechanical interference, prevents further axial travel of the cylinder into the opening.

Figure 5A:
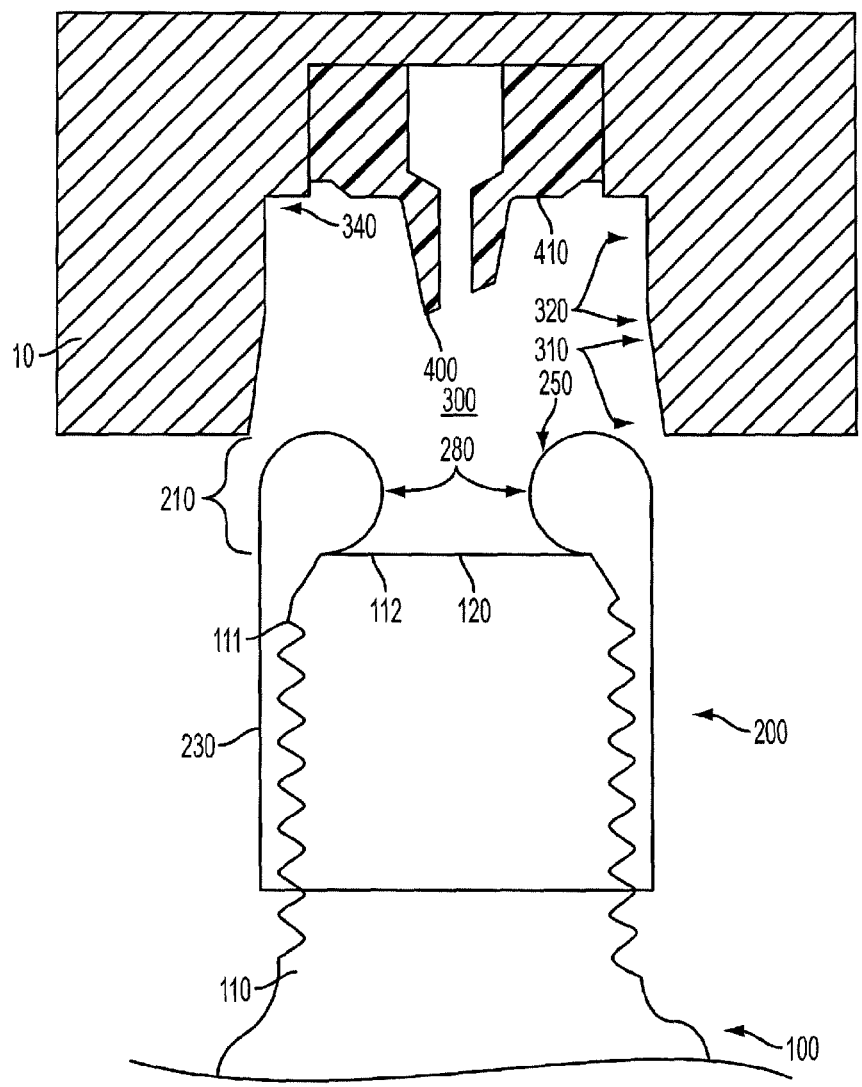
FIGS. 5a-5d depict a sequence of a cylinder and gasket being inserted into a receiving opening at various stages of insertion depth.

In FIG. 5a, the neck 110 of the cylinder 100 is being advanced axially into the opening 300 of a cylinder receiver 10. At this stage and in this illustrative embodiment, the gasket 200 is neither compressed nor deformed, at least from any force outside of the gasket. However, as noted above, the gasket 200 may be stretched or otherwise deformed when engaged with the neck 110 of the cylinder. In this embodiment, the neck 110 of the cylinder is threaded, and the gasket 200 may be threaded onto the neck 110 (whether or not the gasket has corresponding internal threads), pressed over the neck 110, adhered to the neck by an adhesive material, placed over the neck without deformation of the gasket 200, or otherwise engaged with the neck. The architecture of the opening 300 is identical to that in FIG. 4 with the exception that a base 410 of the piercing element 300 is shown and includes an indentation or ridge feature in the bottom surface 340 of the opening 300.

Figure 5B:
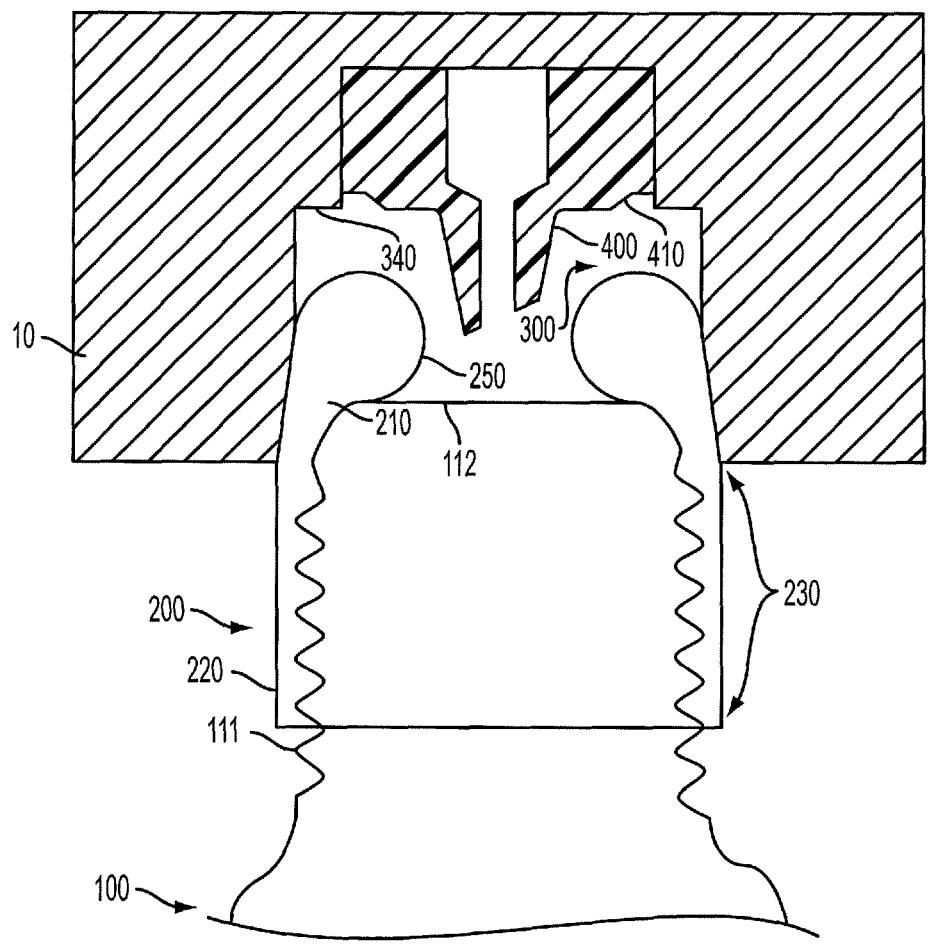
Figure 5C:
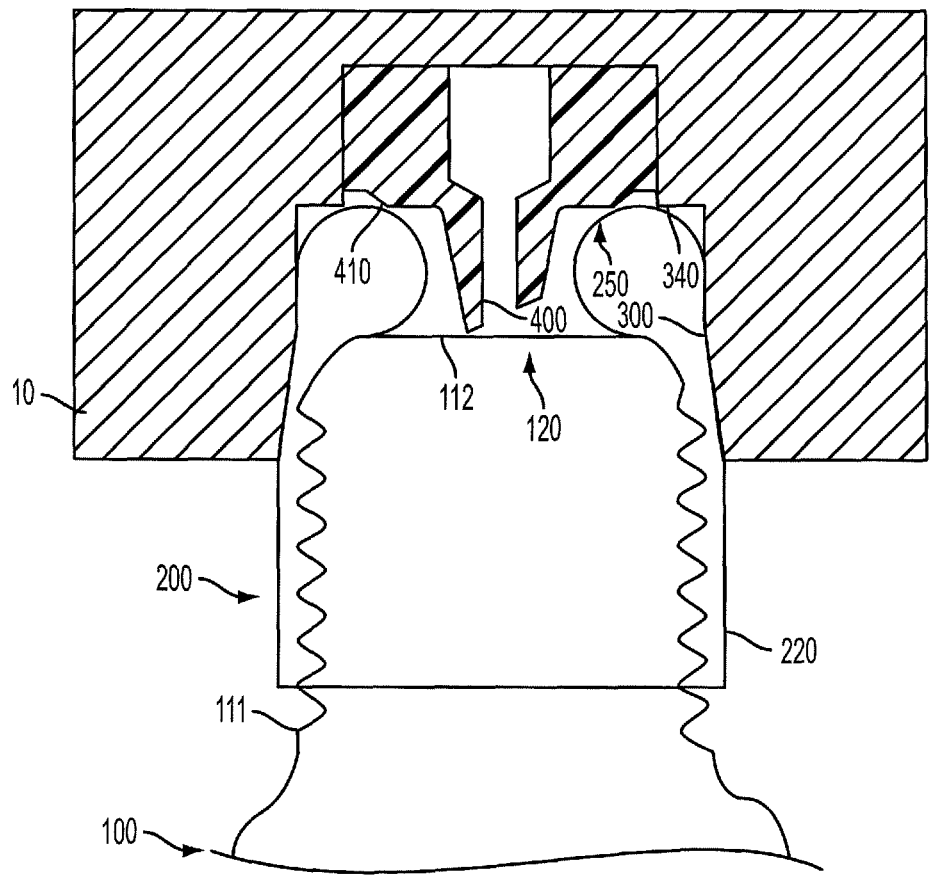
Figure 5D:
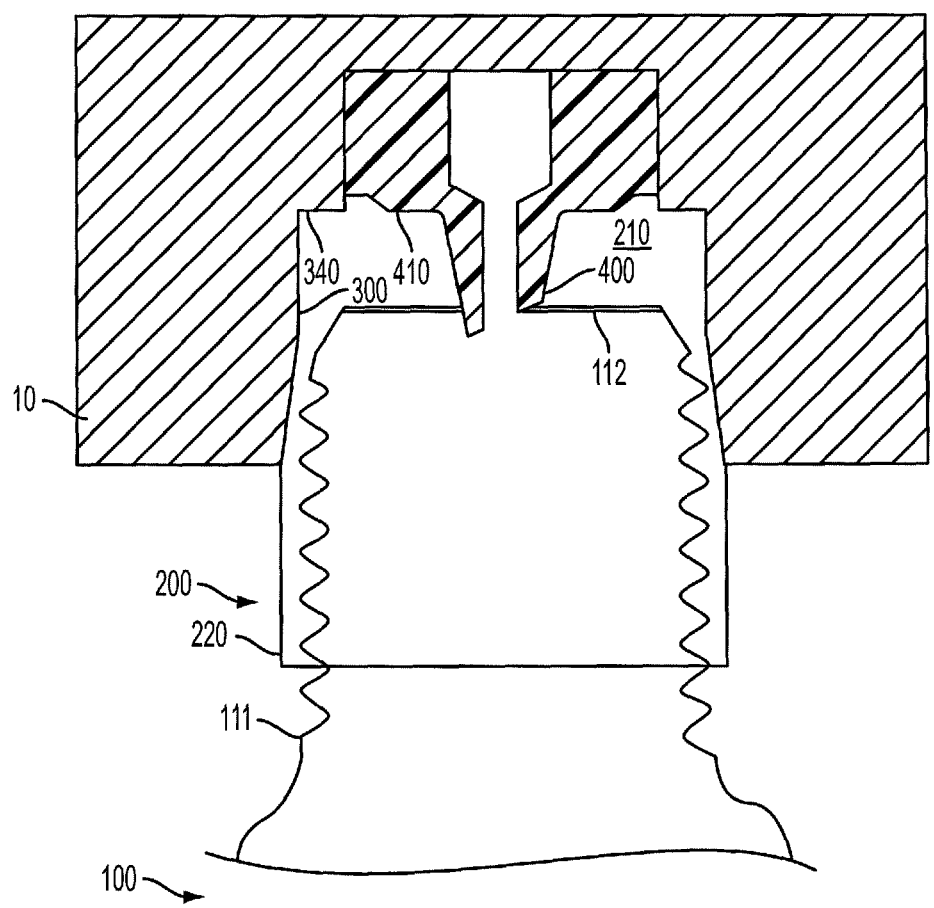
Figure 5E:
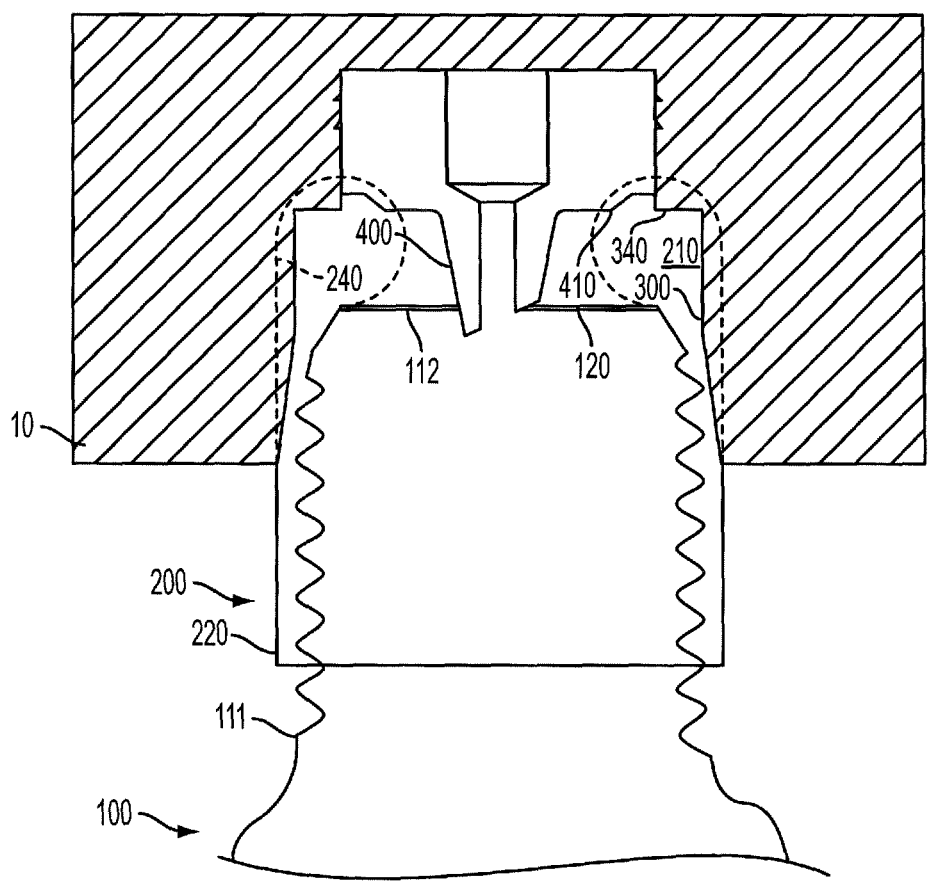
FIG. 5e shows a fully inserted state of the FIGS. 5a-5d embodiment and illustrating deformation of the gasket.

Upon initial insertion of the gasket 200 into the proximal chamfered section 310 of the opening 300 as shown in FIG. 5b, the upper section 210 of the gasket 200 deforms inwardly and/or axially, forming an initial radial gland seal between the gasket sidewall 230 and the opening sidewall and/or the cylinder side surface 111. In FIG. 5c, the cylinder and gasket have been further advanced so that now a face seal forms between the bottom surface 340 and piercing element base 410 and the upper face 250 of the gasket 200. The gasket is deformed axially above and below the threads on the neck 110 and radially about the threads and upper opening 280, e.g., to form a gland seal with the side surface 111 of the neck 110. The radial gland seal between the sidewall 230 of the gasket 200 has now formed in both outer 310 and inner 320 portions of the opening 300. At this point, a fairly strong seal (in the form of a face and gland seal) has been created in preparation for the piercing element 400 to pierce the gas outlet 120 of the cylinder and release the gas held under pressure, e.g., at 2600 psi. Note that the curved profile of the upper portion 210 of the gasket and the void in the upper opening 280 provide space for the gasket to deform into or flatten into and thus permit further axial travel into the opening 300. Finally, FIG. 5d shows the neck fully advanced within the opening 300 and the piercing element 400 having pierced, punctured or otherwise opened the cylinder. The upper portion 210 has been deformed from a rounded o-ring-like structure to conform with the bottom surface 340 and the piercing element base 410 of the opening 300, thus making a strong face seal. The features (steps, ridges, recesses, flange) in the bottom surface 340 and base 410 are operable to capture, bind, or impede the tendency of the gasket to creep or splay out laterally or axially down the neck, but are not necessarily required. Shown also is a gland seal between the piercing element 400 and the upper opening 280, though in some instances this seal does not form. Also, at this stage of insertion, or just prior to it, gasket material may have undergone "creep" or otherwise been forced by the pressurized contents axially down the sidewall 230. However, at the point of advancement when the intersection of the outer portion 310 and inner portion 320 portion of the opening 300 coincides with a tapered end 111 of the neck 110, a binding point or equilibrium between the neck and the bore is created wherein the gasket material no longer deforms or creeps in either axial direction, but compresses and prevents further axial travel of the neck. FIG. 5e illustrates the deformation and compression that the gasket has undergone with a dotted line 240 indicating its initial shape prior to insertion and undergoing stress, and the solid line indicating that the gasket has largely conformed to the shape of the opening 300.

In addition to the previous gasket embodiments described, other variations may be more suited for particular applications and cylinder receiver geometries and arrangements. For example, FIGS. 6a-6d show gaskets 200 with largely featureless sidewalls 230, but having one or more rings (FIG. 6a), dimples (FIG. 6b), ridges or slots (FIG. 6c), and raised bumps (FIG. 6d) presented on the face 250 of the upper portion 210 of the gasket 250. Alternatively, or in addition, such features may be presented on the sidewalls 230. These features may be operable to deform and allow axial travel while still providing a seal and also to bind to features carried in the bottom surface 340 of an opening 300 of a cylinder receiver 10, such as ridges, steps, indentations and the like, to prevent creep and splaying of the gasket.

Figure 6A:
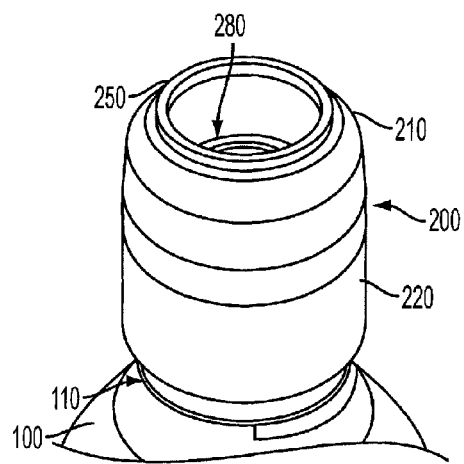
FIGS. 6a-6d show various embodiments of gaskets having different surface features at a face of the upper portion.
Figure 6B:
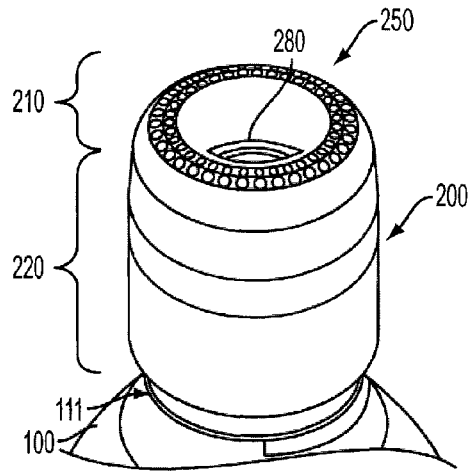
Figure 6C:
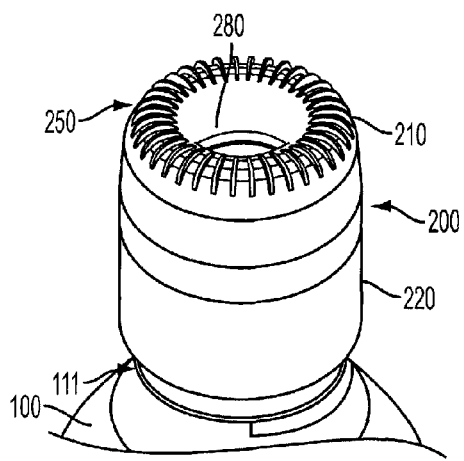
Figure 6D:
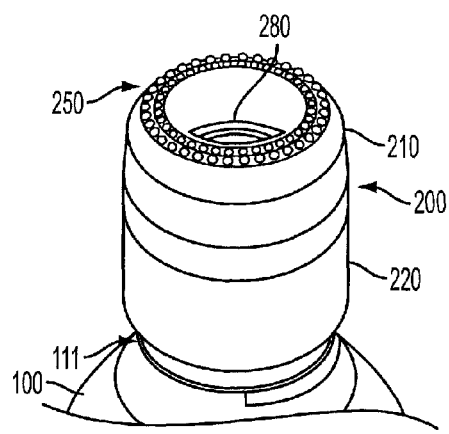
Figure 6E:
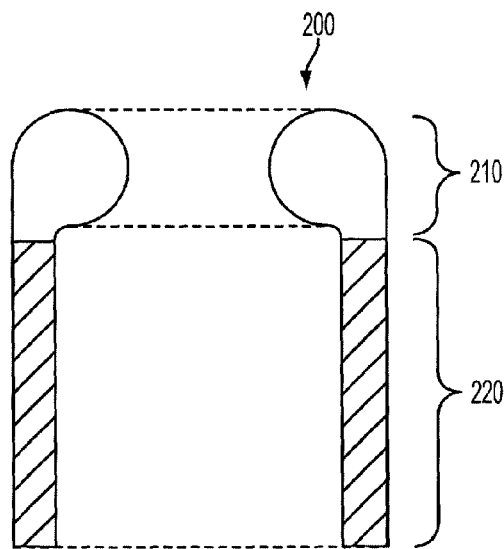
FIGS. 6e-6g show various embodiments of gaskets having different geometries and material properties in different regions of the gasket.
Figure 6F:
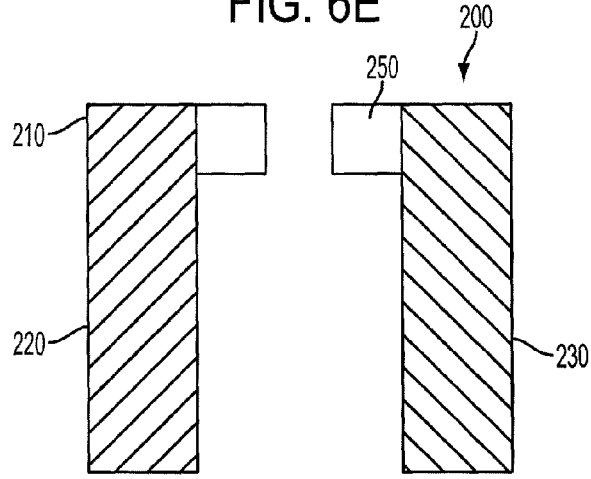
Figure 6G:
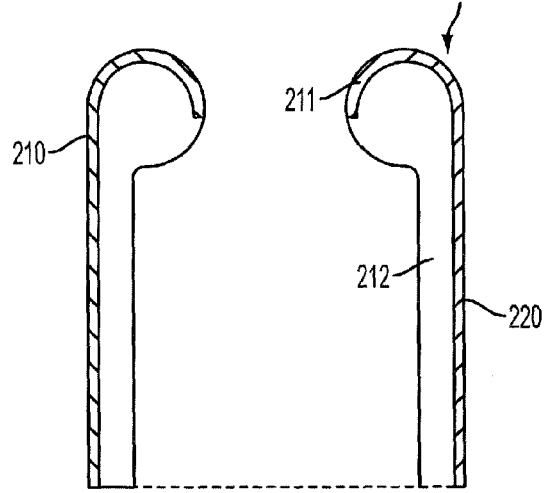

As mentioned above, a gasket may be arranged to have different materials and/or properties in different portions of the gasket. For example, FIGS. 6e-6g show cross-sectional views of gaskets with selected zones of different elasticity, hardness, and/or durometer. In FIG. 6e, the zones are the upper and lower portions 210, 220 of the gasket 200, e.g., the upper portion 210 may have a lower elasticity, hardness or durometer than the lower portion 220, or vice versa. In FIG. 6f, the zones of different material/characteristic are the entire lower portion 220 and a part of the gasket at the outer periphery extending into the upper portion 210 and a radially inner part of the upper portion 210 including an inner part of the face 250 of the gasket 200. Again, these different zones may have a different hardness, elasticity or durometer than each other, and these features may be provided by different materials, treatments (such as thermal or chemical treatments), etc. In FIG. 6g the zones of different material/characteristic are an exterior portion defining the outer surface 211 of the gasket 200 and an interior portion 212 of the gasket 200 intended to contact the side surface 111 and top surface 112 of the neck 110 of a cylinder. The differing zones in the above gaskets may be created through treating or processing a unitary material differently according to the desired properties of each zone or by fashioning the gasket as a composite of more than one material.

Figure 7A:
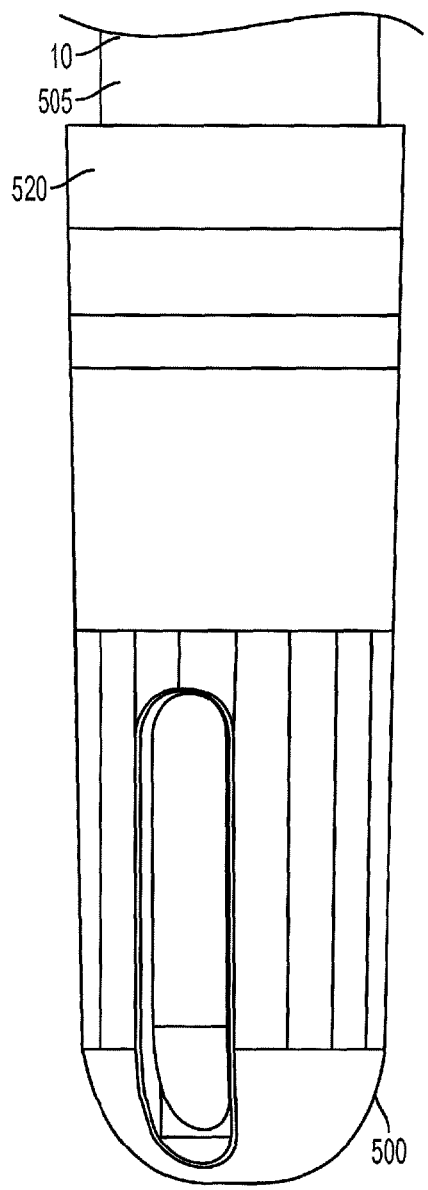
Figure 7B:
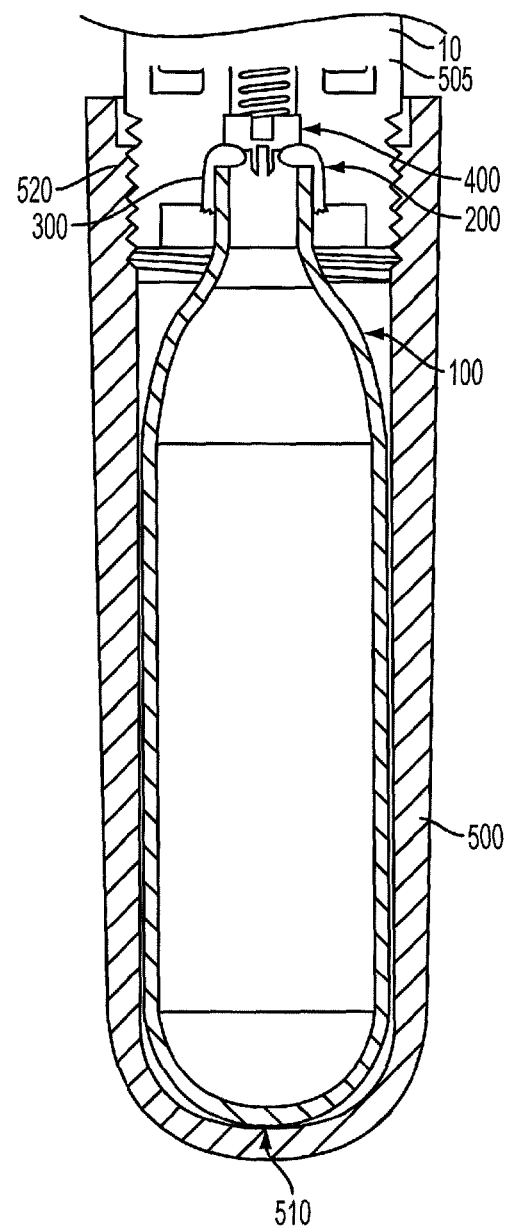

While various cylinder receivers are generally described above, FIGS. 7a and 7 show a side and cross sectional view of a cylinder receiver 10 in an illustrative embodiment. As mentioned above, aspects of the invention may be employed with any suitable cylinder receiver 10 for any gas delivery device, and so the illustrative embodiment of FIGS. 7a and 7b should not be construed as limiting. In this embodiment, the cylinder receiver 10 includes a hollow cup body 500 with a threaded end 520 for coupling with a receiver body 505 and a bearing surface 510 located in the base of the cup body 500. The cup body 500 is arranged to receive the cylinder 100 so that the bearing surface 510 supports the cylinder 100 in the cup body 500. The bearing surface 510 is preferable narrow (but not able to puncture the cylinder) and/or lubricious and is operable not to impart rotational force to the cylinder as the cup body 500 is threaded onto the receiver body 505. As will be appreciated, threading the cup body 500 onto the receiver body 505 advances the neck 110 of the cylinder 100 axially into engagement with the receiver opening 300 and piercing element 400 so that a suitable seal is made and the gas outlet 120 of the cylinder is opened. In this embodiment, the cylinder 100 does not move rotationally while engaging with the opening 300, but such motion is possible, e.g., where a threaded neck of the cylinder threadedly engages with the opening 300.

Although some embodiments described above have a gasket and cylinder arranged to operate with a piercing element that is carried by a cylinder receiver, a piercing element (if required) may be carried on the cylinder. For example, FIG. 8a shows an alternative embodiment that includes a piercing element 400 and a gasket 200 in combination with a cylinder 100. In this example, a smooth necked cylinder (which could alternatively be threaded) is fitted with a gasket 200 as described elsewhere herein and that helps hold a piercing element 400 in place relative to the gas outlet 120. Thus, the piercing element 400 can be carried by the gasket 200, although it is also possible that the piercing element 400 could be separate from the gasket, e.g., attached to the cylinder 100. In this embodiment, the piercing element 400 includes a metal flange (not shown) that extends against and/or under a portion of the upper portion 210 of the gasket 200 and a sharpened arcuate member that extends above the gas outlet 120. In use, a blunt anvil or other component of the receiver engages the piercing element 400 and forces it through the gas outlet 120 while a face and gland seal are provided by the gasket. Of course, the piercing element 400 could be arranged in other ways, e.g., to have a configuration like that shown in FIG. 5e.

Aspects of the invention also relate to configurations for a cylinder receiver, including arrangements for the receiver opening. For example, FIGS. 9a and 9b depict an embodiment of a cylinder 100 and gasket 200 that is arranged similarly to that shown in FIGS. 2a-2c and 3a-3c. Also, a cylinder receiver 10 is shown that is arranged similarly to that in FIGS. 5a-5e. However, in this embodiment, the cylinder receiver 10 includes an opening 300 that receives a piercing element 400 that also forms the bottom surface 340 of the opening when the piercing element 400 is received into the opening 300. This embodiment, at least in part, acts to improve the likelihood of establishing, or the robustness of, a face seal between piercing element 400 and the gasket 200 during the process of engaging the cylinder 100 with the cylinder receiver 10. In this embodiment, gasket 200 is bonded or otherwise attached to the cylinder 100 at the neck 110, and the piercing element base 410 is sealingly engaged with the opening 300 in the position shown in FIG. 9b, e.g., by welding, adhesive, a threaded engagement, friction fit, etc.

As the neck 110 and gasket 200 are introduced into the opening 300, the piercing element 400 contacts and begins to pierce the gas outlet 120, and the upper face of the gasket 250 makes contact with a raised annular ring or ridge 430 on the piercing element base 410 at the bottom surface 340 of the opening 300. (While in this embodiment the ring or ridge is formed on the piercing element base 410, the ring or ridge could be formed on the body of the receiver 10.) This early contact helps to create an early face seal during or prior to piercing of gas outlet 120 as shown in FIG. 9b. As cylinder 100 is advanced further into opening 300, the gasket 200, which is compressible in this embodiment, is able to deform around the ring or ridge 430 at the bottom surface 340, improving the face seal and increasing the extent of rupture of the gas outlet 120 by the piercing element 400. A gland seal may, or may not, be provided by the lower portion 220 of the gasket 200 with the neck 110 and/or the sidewall of the opening 300. The ring or ridge in this embodiment is shown as a simple raised portion with a semi-circular cross section. Alternatively, the ring or ridge 430 could be, or include, a sharpened fin or triangular wedge to increase pressure on the face 250 of the gasket 200. In addition, a multitude of ridges could be employed, e.g., in concentric form. Face 250 of gasket 200 is shown as essentially flat relative to ridge 430. Alternatively, the face 250 could include rounded or annular ridges of its own, potentially providing a mating surface or surfaces with the ring or ridge 430.

FIGS. 10a and 10b depict an alternative embodiment of a piercing element 400/bottom surface 340 arranged to engage with a gasket 200. In this embodiment, the bottom surface 340 of the opening 300 includes an outer annular ramp 450 on the gasket-facing surface of the piercing element base 410 which acts to create a gland or radial compression seal between upper opening 280 of the gasket 200 and the piercing element 400 as the gasket 200 is advanced into the opening 300. In this embodiment, such a radial or gland seal may be formed during and/or after puncture of the gas outlet 120 by the piercing element 400. This radial seal may be additive to the face seal created between gasket 200 and the flat portion of the bottom surface 340 which occurs at full insertion of cylinder neck 110 and gasket 200 into the opening 300. The location of the ramp 450 may also act to improve the seal between gasket 200 and the cylinder neck 110 as ramp 450 wedges the gasket 200 against the neck 110. In this embodiment, the diameter of upper opening 280 is closely matched to the diameter of the piercing element 400 to generate a gland seal soon after contact with ramp 450, although such a seal need not be made. Thus, the upper opening 280 in this and other embodiments may be smaller than, equal to, or larger than an outer diameter of the piercing element 400, depending upon the desired amount of gland seal, given the mating surfaces of the gasket, piercing element and receiver opening. Ramp 450 is shown to be part of the piercing element base 410, but alternatively could be integral to the receiver body. Also, ramp 450 is shown as a simple ramped or chamfered surface, but could alternatively be a simple stepped geometry, employ a parabolic ramp, or other varying ramp surface.

FIGS. 11a and 11b depict another alternative embodiment for arranging a bottom surface 340 of a receiver opening 300. Again, the surface features defining the bottom surface 340 are arranged on a base 410 of a piercing element 400, but could be arranged on the receiver body, or a combination of a receiver body and a piercing element or other component. In this embodiment, an additional ramp 400' is provided in addition to a ramp 450 like that in FIGS. 10a and 10b. This arrangement provides an annular cavity at the bottom surface 340 and enables improved gland sealing between the gasket 200, the base 410 and the piercing element 400. As gasket 200 is advanced into the narrowing region formed between ramp 450 and the ramp 400', the gasket 200 is compressed radially, improving the gland seal. Ramp 450 and the ramp 400' are shown to contact gasket 200 at a same point of advancement of cylinder neck 110 into opening 300, but alternatively, the outer ramp 450 could be longer, i.e. could contact gasket 200 earlier than the inner ramp 400', or visa-versa. Again, ramp 450 and/or 400' could alternatively be formed in the opening 300 while achieving the same goal.

FIGS. 12a and 12b depict yet another alternative embodiment for a gasket 200 that acts to improve a face seal between the face 250 and the bottom surface 340 of the receiver opening 300. In this embodiment, gasket face 250 has a raised annular ridge 250' positioned at or near the outer periphery of the gasket 200. This raised ridge 250' forms a cup-shaped or bowl-shaped depression in the face 250 and makes contact with the bottom surface 340 prior to opening of the gas outlet 120 by the piercing element 400. As cylinder 100 is advanced into the opening 300, the ridge 250' is compressed against surface 340, creating a face seal as shown in FIG. 12b. As the cylinder is advanced further, ridge 250' compresses further, ultimately allowing contact between the remainder of the face 250 with the bottom surface 340. Ridge 250' is biased toward the outer periphery of the gasket 200 to take advantage of pressure released from the cylinder 100 following piercing by the piercing element 400 to create a gland seal as the pressure forces the ridge 250' outwardly against the sidewall of the opening 300. However, in alternate embodiments, such a gasket-face ridge could be biased toward an inner portion of the opening 300 or may be located anywhere along the gasket face 250. Again, the lower portion 220 of the gasket 200 may, or may not, provide a gland seal. The ridge is shown as a radiused projection from face 250, but could be effective in a variety of different shapes and cross sections. In addition, bottom surface 340 is shown as flat, but could alternatively employ ramps or ridges as in the embodiments depicted in FIGS. 9-11, or alternatively employ mating reliefs into bottom surface 340.

FIGS. 13a and 13b depict an alternative embodiment of gasket 200 employing a feature 231 on the outer surface of the lateral sidewall 230 of the gasket 200. This feature creates an improved gland seal between the feature 231 and the sidewall surface 320 of the opening 300 prior to puncture of the gas outlet 120 by the piercing element 400. In this embodiment, feature 231 is a simple raised annular ridge or ring about the circumference of gasket lateral sidewall 230, and has an outer diameter that is greater than the inner diameter of opening 300 as defined by the sidewall surface 320. Hence, once feature 231 enters the region of the opening encompassed by the sidewall surface 320, a gland seal is created between surface 320 and the gasket 200 in the region of the feature 231. This seal is preferably formed prior to puncture of the gas outlet 120 by the piercing element 400. As cylinder 100 is advanced further into the opening 300, a face seal may be additionally created between gasket 200 and the bottom surface 340, though may not be required. While only one feature 231 is shown in this embodiment, there could be multiple features of varying size and/or geometry located at various points along gasket lateral sidewall 230 to optimize the extent of a gland seal formed during various stages of insertion of cylinder neck 110 into bore 300. Moreover, such features 231 may be provided on the inner surface of the lower portion 220 of the gasket 200 for interaction with the cylinder neck side surface 111.

FIGS. 14a and 14b depict another embodiment that includes a ring 600 for securing the gasket 200 to a cylinder neck 110. As discussed above, a gasket 200 may be permanently attached to a cylinder, or not, and may be attached in a variety of different ways. In this embodiment, the ring 600 is secured over a part of the gasket lateral sidewall 230, compressing the lateral sidewall 230 portion against the cylinder neck 110. In some embodiments, the amount of compression is great enough to create a gland seal between the gasket lower portion 220 and the cylinder neck 110 sufficient to resist a peak filling pressure of cylinder 100, e.g., 2600 psi. However, in other embodiments, the ring 600 may fit relatively loosely over the gasket 200. In FIG. 14b, the ring 600 is shown compressing lateral wall 230 against the cylinder neck 110, however, a portion of the ring 600 extends above both the neck 110 and the top surface of the neck 110. Such an extension can support portions of the gasket 200 above the top surface 112 against extruding through any gap between cylinder neck 110 and the wall of opening 300. In a preferred use, the outer diameter of the ring 600 would be close to, but smaller than the diameter of the opening 300 of a receiver 10, with a "slip-fit" being optimal. However, in other arrangements, the outer diameter of the ring 600 may be larger than the opening 300 (or at least a portion of the opening 300 with which the ring 600 engages) so that the ring 600 is clamped onto the gasket 200 and the neck 110. This may help create a gland seal between the gasket 200 and the neck 110 and/or the ring 600. In this embodiment, the ring 600 is shown as a separate piece that is assembled over gasket 200 and neck 110. Alternatively, the ring 600 could be molded within the gasket 200, e.g., as part of the lateral sidewall 230 of the lower portion 220. The ring 600 in some embodiments is preferably made from a material highly resistant to hoop stress or tensional forces, and could be entirely rigid or flexible, at least in part. Also, while the ring 600 is shown as a single, unitary body, the ring 600 could include multiple smaller rings that are adjacent each other, or spaced apart at any suitable distance along the length of the gasket 200. In another arrangement, the ring 600 could be formed from a tightly wound string, wire, strand or cable that is wrapped either once or multiple times around the gasket 200.

The embodiment of FIGS. 14a and 14b depict one illustrative embodiment of a mechanical interlock between the gasket 200 and the cylinder 100, and it should be understood that other arrangements are possible. Such an interlock could alternatively be achieved by threading of the internal surface of lower portion 220 that engages with threading of cylinder neck 110. Alternatively or in addition, the gasket 200 could be glued, ultrasonically welded to, or insert molded about the neck 110 of the cylinder 100. In the depicted embodiments, the gasket 200 is shown covering portions of the cylinder neck and at least a portion of the top surface of the cylinder neck. Alternatively, the gasket 200 could cover the entirety of the outer surface of cylinder 100, or portions thereof.

FIGS. 15a and 15b depict a further embodiment of a gasket assembly operable to provide a gland seal with a side wall of a gas cylinder receiver. In this embodiment, the gasket includes a top sleeve 201, a bottom sleeve 202, and a resilient element 203 positioned between the top and bottom sleeves 201, 202. The bottom sleeve 202, resilient element 203 and a part of the top sleeve 201 form a lower portion 220 of the gasket 200, and an upper part of the top sleeve 201 forms an upper portion 210 of the gasket 200. The top and bottom sleeves 201, 202 are configured to form a groove or seat in which the resilient element 203 may be carried and so that the top and bottom sleeves 201, 202 can exert a force on the resilient element 203 that causes the resilient element 203 to expand radially outward and/or inward. In this embodiment, the top and bottom sleeves 201, 202 are arranged to be capable of movement toward each other so that the resilient element 203 is squeezed between the top and bottom sleeves 201, 202, i.e., the top and bottom sleeves 201, 202 may exert an axial force on top and bottom surfaces of the resilient element 203. This axial force may cause the resilient element to expand radially inwardly and/or outwardly. Outward and/or inward radial movement of the resilient element 203 may cause the resilient element to form a gland seal with a sidewall of a gas cylinder receiver opening and/or with a portion of the sleeves 201, 202 or the side surface 111 of the neck 110.

While in this embodiment the top and bottom sleeves 201, 202 are arranged to be concentric and slidably coupled to each other to allow for axial translation relative to each other, such an arrangement is not necessary. For example, the top and bottom sleeves 201, 202 may have a simple cylindrical shell shape and be positioned on upper and lower sides, respectively, of the resilient element 203. Also, while in this embodiment the top and bottom sleeves 201, 202 are interlocked so that movement of the sleeves 201, 202 away from each other is limited (e.g., a hook 201a at a lower end of the top sleeve 201 may engage a hook 202a of the bottom sleeve 202 to prevent removal of the top sleeve 201), such an arrangement is not necessary. Instead, the sleeves 201, 202 may be made easily separable, if desired, e.g., so that the top sleeve 201 can be removed from the gasket 200. Also, the hooks 201a, 202a may be beveled, e.g., to help allow insertion of the hook 201a into a space defined by the bottom sleeve 202 below the hook 202a.

While in this embodiment, radial movement of the resilient element 203 is caused by applying an axial force to the resilient element 203, the gasket 200 may be arranged to apply a radial force to the resilient element 203, or a force that includes radial and axial components. For example, surfaces of the top and bottom sleeves 201, 202 that engage the resilient element 203 at the groove may be beveled so that as the sleeves 201, 202 are moved toward each other, the bevels push the resilient element 203 radially outwardly. In another embodiment, the sleeves 201, 202 may each have tapered portions that engage each other so that the groove in which the resilient element 203 sits expands radially outwardly. For example, the top sleeve 201 may have a frusto-conically tapered lower end that is received inside of an upper end of the bottom sleeve 202. Insertion of the tapered lower end of the top sleeve 201, 202 may cause the upper end of the bottom sleeve 202 to expand radially outwardly (whether through elastic and/or plastic deformation, or other movement), which exerts a radially outward force on the resilient element 203. Other arrangements are possible.

While in this embodiment the bottom sleeve 202 is fixed relative to the cylinder neck 110 (e.g., by threaded engagement of the bottom sleeve 202 with the neck 110, by an adhesive, welding, etc.) and the top sleeve 201 is movable relative to the cylinder neck 110 and the bottom sleeve 202, other configurations are possible. For example, the top sleeve 201 may be fixed relative to the neck 110 and the bottom sleeve 202 may be moveable (e.g., upwardly toward the top surface 112 of the neck 110). Alternately, both the top and bottom sleeves 201, 202 may be moveable relative to the neck 110 and to each other.

In this illustrative embodiment, the upper portion 210 of the gasket 200 does not include an element that is positioned over the top surface 112 of the neck 110, but such an element could be provided, e.g., in an arrangement like any of those discussed herein. Such an element may be attached to the upper end of the top sleeve 201, or may be an independent part positioned over the top surface 112. Also, the upper end of the top sleeve 201 may be arranged to form a face seal (e.g., with a bottom surface of a receiver opening), or not. Further, the top sleeve 201 may carry a piercing element, whether the piercing element is attached to the top sleeve 201 or not.

In use, the assembled gasket 200 in the form shown in FIG. 15a may be inserted into a cylinder receiver 10, e.g., a receiver opening 300 that has a cylindrical shape with straight sidewalls 310, 320 and a flat bottom surface 340. As the top sleeve 201 contacts the bottom surface 340 and the cylinder neck 110 and bottom sleeve 202 are further inserted into the opening 300, the top sleeve 201 moves toward the bottom sleeve 202, exerting a force on the resilient element 203. As a result, the resilient element 203 may move radially outwardly and form a gland seal with the sidewall of the receiver opening. The seal may be maintained by fixing the cylinder and/or the relative positions of the top and bottom sleeves 201, 202, e.g., by having locking elements of the sleeves 201, 202 engage each other or fixing the cylinder in place relative to the receiver 10. Movement of the top and bottom sleeves 201, 202 toward each other may be limited, e.g., to prevent excessive force from being applied to the resilient element 203. In the embodiment of FIG. 15b, such movement is limited by the hook 201a contacting a stop at the bottom end of the bottom sleeve 202, although other arrangements are possible.

To disengage the cylinder 100 from the receiver 10, the sleeves 201, 202 may be moved away from each other, allowing the resilient element 203 to move radially inwardly. In some embodiments, the top sleeve 201 may include a feature that helps retract the resilient element 203 radially inwardly and away from the sidewall of the receiver opening 300, e.g., to disengage the gland seal and release the resilient element from the sidewall. For example, the top sleeve 201 may include an inwardly angled bevel positioned over the resilient element 203 that is arranged to engage with an upper, outer surface of the resilient element 203 and pull the resilient element 203 radially inwardly as the neck 110 is pulled from the opening 300. Again, other arrangements are possible, such as an outer sleeve that slides over the resilient element 203.

Various modifications to the FIGS. 15a and 15b embodiment are possible. For example, a gasket 200 may include a multiple sleeves and resilient elements coupled to a cylinder neck. The sleeves 201, 202 may be made of any suitable material or combination of materials, such as metal or plastic. Similarly, the resilient element 203 may be made of, or include a suitable material, such as rubber, neoprene, and others (including those mentioned herein).

While each disclosed embodiment depicts various features that are useful in sealing cylinder 100 to receiver 10, these features could be used either singularly or in combination to achieve various preferred results depending on the given application.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A gasket for a compressed gas cylinder having a neck with a top surface around a gas outlet and a side surface extending downwardly from the top surface, the gasket comprising:
   an upper portion including a radially extending portion that defines a face and is arranged for positioning on a top surface of a compressed gas cylinder and for making a seal with the top surface;
   a lower portion extending downwardly from the upper portion and having a sidewall portion arranged to extend around a side surface of a neck of the cylinder, the sidewall portion of the lower portion being arranged to make a seal with the side surface; and
   a ring including a rigid material that extends around a part of the lower portion and is arranged to hold the gasket on the neck, the ring being configured to extend over a part of the sidewall portion below the top surface of the neck to compress the sidewall portion against the neck, and the ring being configured to extend above the top surface of the neck to support portions of the upper portion above the top surface against extrusion, the face of the upper portion being exposed and uncovered by the ring,
   wherein the radially extending portion of the upper portion is arranged to engage and form a gas-tight seal with the top surface of the compressed gas cylinder to resist gas leakage past the seal with a gas exiting a gas outlet of the gas cylinder at a pressure of 1000 to 3500 psi, and
   wherein the upper portion and the lower portion are formed as a single piece and are made of an elastomeric material having a durometer of 50 to 100 on the Shore A scale.

2. The gasket of claim 1, wherein the lower portion includes a continuous sidewall portion arranged to extend around the side surface of the neck of the cylinder and to form a seal with the side surface.

3. The gasket of claim 1, wherein the upper portion includes an upper opening near a center of the upper portion arranged for positioning over the gas outlet.

4. The gasket of claim 3, wherein the upper portion at the opening is arranged to engage with and make a seal with a piercing element used to pierce the gas outlet.

5. The gasket of claim 4, wherein the upper portion at the opening is arranged to form a gland seal with the piercing element.

6. The gasket of claim 1, wherein the lower portion is attached to and extends downwardly from an outer periphery of the upper portion.

7. The gasket of claim 1, wherein the lower portion has a cylindrical shell shape or a frustoconical shape.

8. The gasket of claim 1, wherein the upper and lower portions together form a cup-shaped interior space arranged to receive a part of the neck of the cylinder.

9. The gasket of claim 8, wherein the cup-shaped interior space is tapered to have a smaller size near the upper portion than near a bottom end of the lower portion.

10. The gasket of claim 1, further comprising a gas cylinder with the gasket attached to a neck of the gas cylinder.

11. An assembly including:
    a compressed gas cylinder having a neck with a top surface around a gas outlet and a side surface extending downwardly from the top surface, the gas cylinder containing a gas under a pressure of 1000 to 3500 psi that is releasable from the cylinder through the gas outlet; and
    a gasket attached to the neck of the gas cylinder, the gasket including:
       an upper portion including a radially extending portion that defines a face and is positioned on the top surface of the gas cylinder;

a lower portion extending downwardly from the upper portion and having a sidewall portion arranged to extend around the side surface of the neck of the cylinder; and a ring including a rigid material that extends around a part of the lower portion and is arranged to hold the gasket on the neck, the ring being configured to extend over a part of the sidewall portion below the top surface of the neck to compress the sidewall portion against the neck, and the ring being configured to extend above the top surface of the neck to support portions of the upper portion above the top surface against extrusion, the face of the upper portion being exposed and uncovered by the ring, wherein the radially extending portion of the upper portion is arranged to engage and form a gas-tight seal with the top surface of the gas cylinder to resist gas leakage past the seal with a gas exiting the gas outlet at a pressure of 1000 to 3500 psi, and wherein the upper portion and the lower portion are formed as a single piece and are made of an elastomeric material having a durometer of 50 to 100 on the Shore A scale.

* * * * *